(12) United States Patent
Thompson

(10) Patent No.: US 9,488,161 B2
(45) Date of Patent: Nov. 8, 2016

(54) THERMAL EXPANSION DRIVE DEVICES AND RELATED METHODS

(71) Applicant: Terry W. Thompson, Forest City, NC (US)

(72) Inventor: Terry W. Thompson, Forest City, NC (US)

( * ) Notice: Subject to any disclaimer, the term of this patent is extended or adjusted under 35 U.S.C. 154(b) by 209 days.

(21) Appl. No.: 14/222,571

(22) Filed: Mar. 21, 2014

(65) Prior Publication Data

US 2014/0290238 A1 Oct. 2, 2014

Related U.S. Application Data

(60) Provisional application No. 61/803,866, filed on Mar. 21, 2013.

(51) Int. Cl.
| | | |
|---|---|---|
| *F01B 29/00* | (2006.01) | |
| *F01K 25/00* | (2006.01) | |
| *F01B 29/10* | (2006.01) | |
| *F02G 1/04* | (2006.01) | |
| *F03G 7/06* | (2006.01) | |

(52) U.S. Cl.
CPC ..................... *F03G 7/06* (2013.01)

(58) Field of Classification Search
CPC ........................................ F03G 7/06
USPC ................. 60/675, 639, 516–526, 508–515
See application file for complete search history.

(56) References Cited

U.S. PATENT DOCUMENTS

| | | | | |
|---|---|---|---|---|
| 3,509,716 A | * | 5/1970 | Avery | C02F 1/14 60/531 |
| 4,074,534 A | * | 2/1978 | Morgan | F03G 3/00 60/531 |
| 2010/0313563 A1 | * | 12/2010 | Gronback | F01K 11/04 60/639 |
| 2013/0000303 A1 | * | 1/2013 | Godwin | F01K 11/04 60/660 |

* cited by examiner

*Primary Examiner* — Kenneth Bomberg
*Assistant Examiner* — Deming Wan
(74) *Attorney, Agent, or Firm* — J. Bennett Mullinax LLC

(57) ABSTRACT

Thermal expansion drive devices and related methods are provided herein. A thermal expansion drive device can include a driven shaft that is configured to rotate and multiple dual heat exchanger units centered around the driven shaft. The multiple dual heat exchanger units are configured to drive rotation of the driven shaft through the creation of a gravitational imbalance in the thermal expansion drive device as portions of the multiple dual heat exchanger units are heated and cooled.

19 Claims, 10 Drawing Sheets

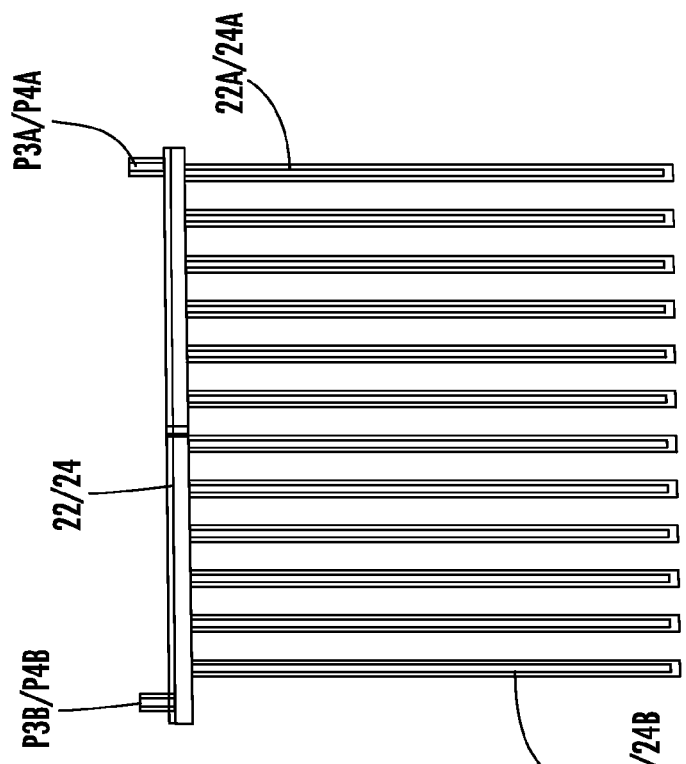
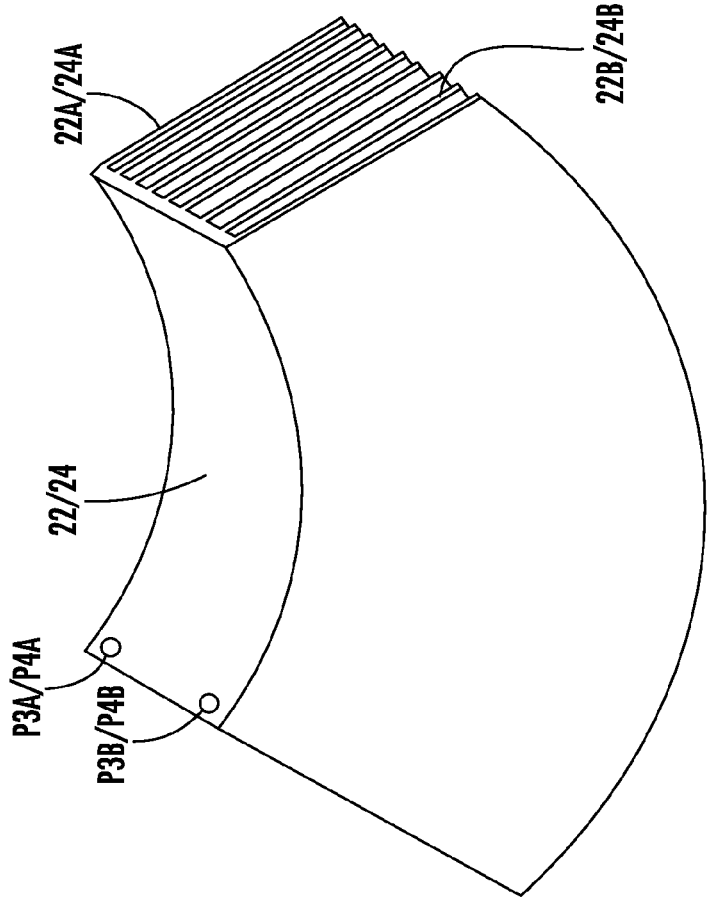

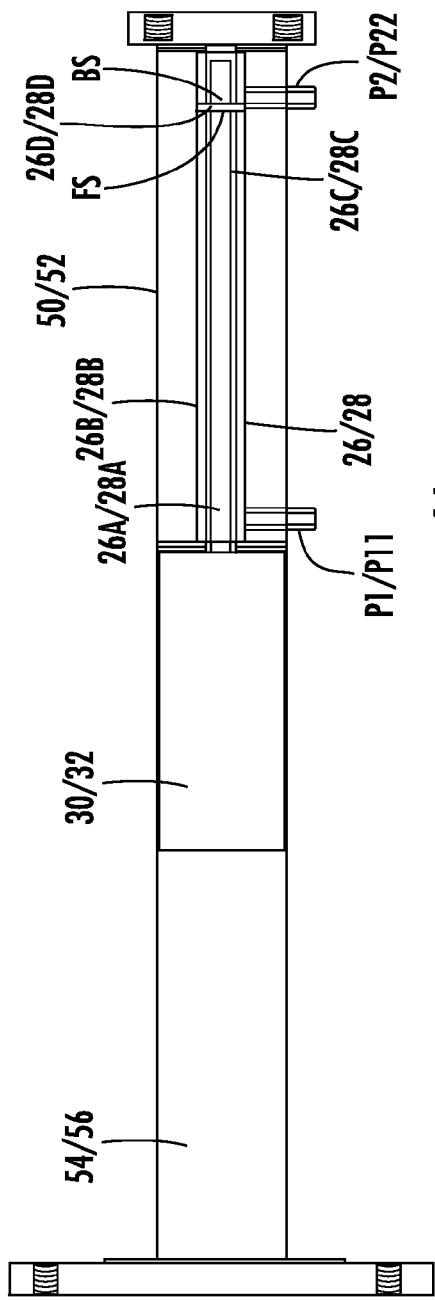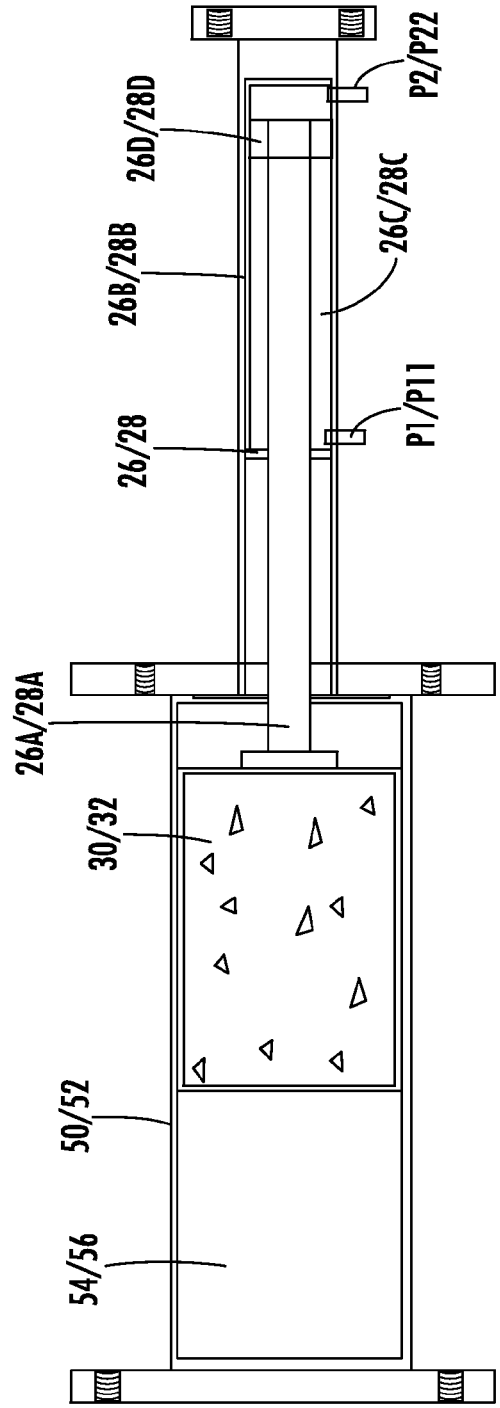
FIG. 4A
FIG. 4B

THERMAL EXPANSION DRIVE DEVICES AND RELATED METHODS

RELATED APPLICATION

The presently disclosed subject matter claims the benefit of U.S. Provisional Patent Application Ser. No. 61/803,866, filed Mar. 21, 2013, the disclosure of which is incorporated herein by reference in its entirety.

TECHNICAL FIELD

The subject matter disclosed herein relates to thermal expansion drive devices and related methods for generating power and/or energy. In particular, the present subject matter relates to thermal expansion drive devices and related methods for generating power and/or energy by rotating a driven shaft through the creation of a gravitational imbalance within the thermal expansion drive device.

BACKGROUND

The demand for energy is on the rise across the world. At the same time, civilization's most reliable energy sources, fossil fuels, are essentially non-renewable and have become more scarce, have been identified as the main culprit in the rise of greenhouse gases and pollution in the earth's atmosphere, and have caused social and political unrest as a result of their location and control. Due to the worldwide and ever increasing energy demand and the world's reliance on non-renewable energy sources, research increasingly focuses on ways to produce energy or power through the use of alternative and renewable sources of energy. This research may also be spawned by an increased desire to provide energy for people living in remote locations around the world who now live without power.

Current forms of power production are generally considered to be inefficient. Power for the most part is generated by boiling water to steam. The pressure from the steam turns a turbine, which, in turn, turns a generator. Nuclear energy and coal are the two leading producers of power. Both nuclear and coal power plants operate at about 33% efficiency, meaning about 66% of the heat that is generated is discarded.

Certain types of direct drive device and generators have been developed to take advantage of low to moderate thermal differentials. For example, PCT International Patent Application Publication No. WO98/007962 discloses a direct drive method that uses stationary heat exchangers to heat and cool a working fluid to drive piston heads, crank shafts, camshafts and/or connecting rod technology in a manner similar to the internal combustion engine to generator power. Similarly, U.S. Pat. No. 4,283,915 discloses a thermal hydraulic engine that also utilizes stationary heat exchangers into and out of which hot and cold fluids are pumped in order to control the thermal expansion of the working fluid. Both PCT International Patent Application Publication No. WO98/007962 and U.S. Pat. No. 4,283,915 are incorporated herein by reference in their entirety as to their description of thermal expanding working fluids and the use of thermal differentials and working fluids to drive a power generating device.

Such devices may possibly be used to take advantage of wasted energy, for example, heated water from power plants or other sources, such as solar energy or geothermal collection devices, or to take advantage of any other sources of fluids that can have a low or moderate temperature differential.

SUMMARY

It is an object of the present disclosure to provide novel thermal expansion gravity drive devices and related methods of using the same. For example, thermal expansion gravity drive devices and related methods are disclosed herein that allow for the extraction of energy from a relatively small thermal difference between a warm water energy source and a cool water source through the process of thermal expansion and contraction of a working fluid to drive one or more hydraulic cylinders and to displace large mass weights in a frame that will create a gravitational imbalance and ultimately a rotational force of that frame.

A few objects of the presently disclosed subject matter having been stated hereinabove, and which are achieved in whole or in part by the presently disclosed subject matter, other objects will become evident as the description proceeds below when taken in connection with the accompanying documents, pictures and figures.

BRIEF DESCRIPTION OF THE DRAWINGS

A full and enabling disclosure of the present subject matter to one of ordinary skill in the art is set forth more particularly in the remainder of the specification and in the other documents, pictures and figures attached herewith, including reference to the accompanying figures in which:

FIGS. 3A and 3B illustrate a front perspective view and a side view of an embodiment of a heat exchanger that can comprise a portion of an embodiment of a thermal expansion drive device according to the subject matter disclosed herein;

FIGS. 4A and 4B illustrate side views of an embodiment of a house assembly that can comprise a portion of an embodiment of a thermal expansion drive device according to the subject matter disclosed herein;

DETAILED DESCRIPTION

Reference will now be made in detail to the description of the present subject matter, one or more examples of which are shown in the pictures and figures. Each example is provided to explain the subject matter and not as a limitation. In fact, features illustrated or described as part of one embodiment may be used in another embodiment to yield still a further embodiment. It is intended that the present subject matter cover such modifications and variations.

Although the terms first, second, right, left, front, back, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer or section. Thus, a first feature, element, component, region, layer or section discussed below could be termed a second feature, element, component, region, layer or section without departing from the teachings of the disclosure herein.

Embodiments of the subject matter of the disclosure are described herein with reference to schematic illustrations of embodiments that may be idealized. As such, variations from the shapes and/or positions of features, elements or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted or simplified to facilitate explanation of the subject matter disclosed herein. Thus, the features, elements or components illustrated in the figures are schematic in nature and their shapes and/or positions are not intended to illustrate the precise configuration of a leg protector and are not intended to limit the scope of the subject matter disclosed herein.

With thermal expansion gravity drive devices as disclosed herein, power can be created through a relatively small temperature differential. For example, since the power plants often use heated water to produce create electricity, the power output from traditional power stations can easily double their output. Since the thermal expansion gravity drive device can operate on a temperature difference, the waste heat from coal and nuclear power can provide the temperature differential to easily operate thermal expansion gravity drive devices. The thermal expansion gravity drive devices can utilize an indirect drive method by the displacement of a mass weight in one or more cylinders.

Figure 2:
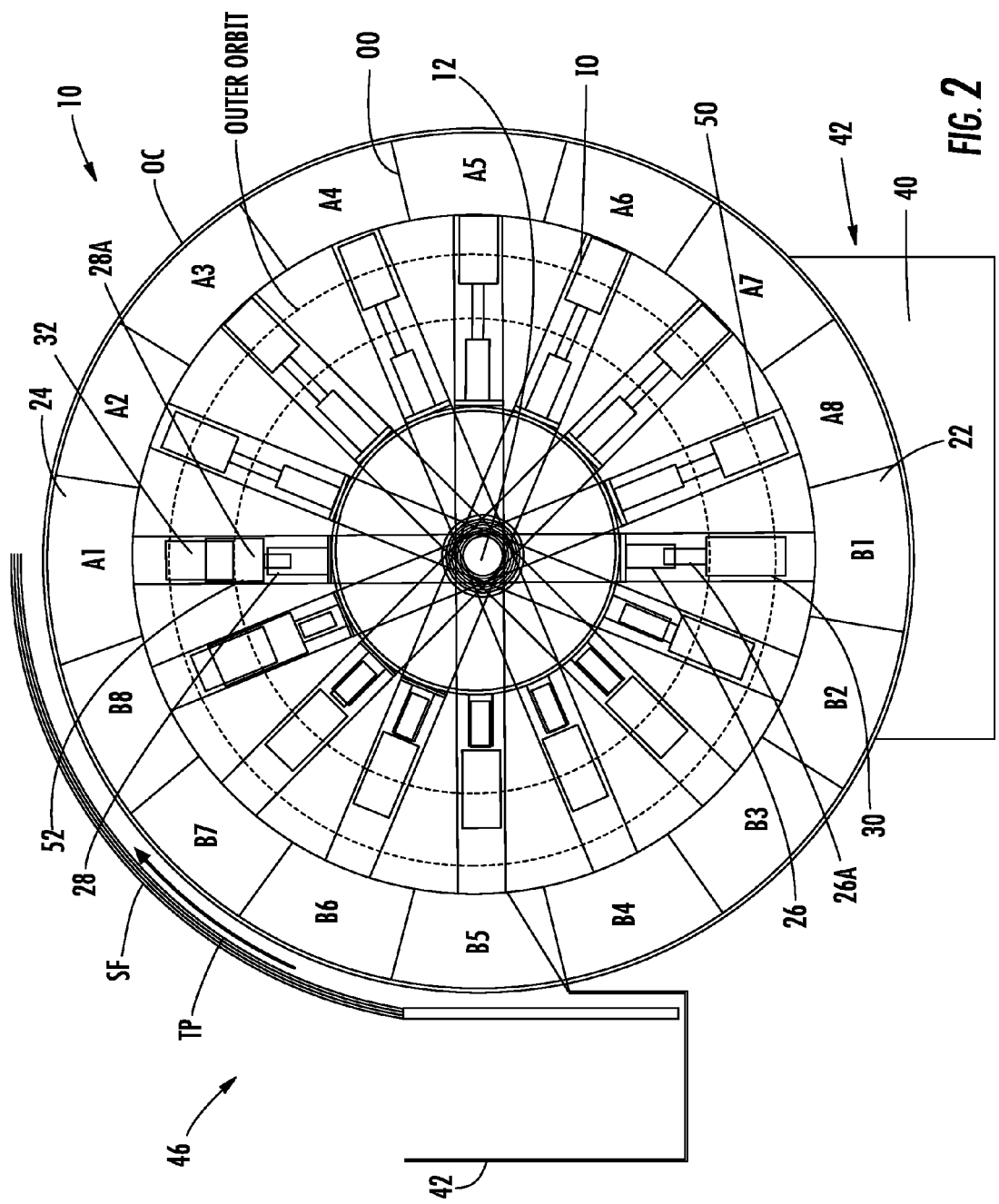
FIG. 2 illustrates a front plan view of an embodiment of a thermal expansion drive device according to the subject matter disclosed herein.

As seen in FIGS. 2, 5A-5D and 8, an embodiment of a thermal expansion drive device, generally designated 10 that can comprise a driven shaft 12 configured to rotate about an axis 14. The thermal expansion drive device 10 can also comprise a set of multiple dual heat exchanger units 20 centered around the driven shaft 12. The set of multiple dual heat exchanger units 20 can be configured to drive the rotation of the driven shaft 12 through the creation of a gravitational imbalance in the thermal expansion drive device 10 as portions of the multiple dual heat exchanger units 20 are heated and cooled. In particular, as shown in FIG. 2, the multiple dual heat exchanger units 20 can be centered around the driven shaft 12 to form an outer circumference OC of the thermal expansion drive device 10. A first fluid source 40 can be provided at a first location 42 along the travel path TP of first and second heat exchangers 22, 24 which are positioned at opposing sides/positions A1:B1, A2:B2, A3:B3, A4:B4, A5:B5, A6:B6, A7:B7, and A8:B8 of the multiple dual heat exchanger units 20. Similarly, a second fluid source 44 can be provided at a second location 46 along the travel path TP of the first and second heat exchangers 22, 24.

As will be explained further below, the first fluid source 40 can be configured to provide a first fluid FF to contact the first and second heat exchangers 22, 24 of the set of multiple dual heat exchanger units 20 as they pass through the first location 42 of the thermal expansion drive device 10 as the driven shaft 12 is rotated. Similarly, the second fluid source 44 can be configured to provide a second fluid SF to contact the first and second heat exchangers 22, 24 of the set of multiple dual heat exchanger units 20 as the first and second heat exchangers 22, 24 pass through the second location 46 along the outer circumference OC of the thermal expansion drive device 10 as the driven shaft 12 is rotated.

Figure 1A:
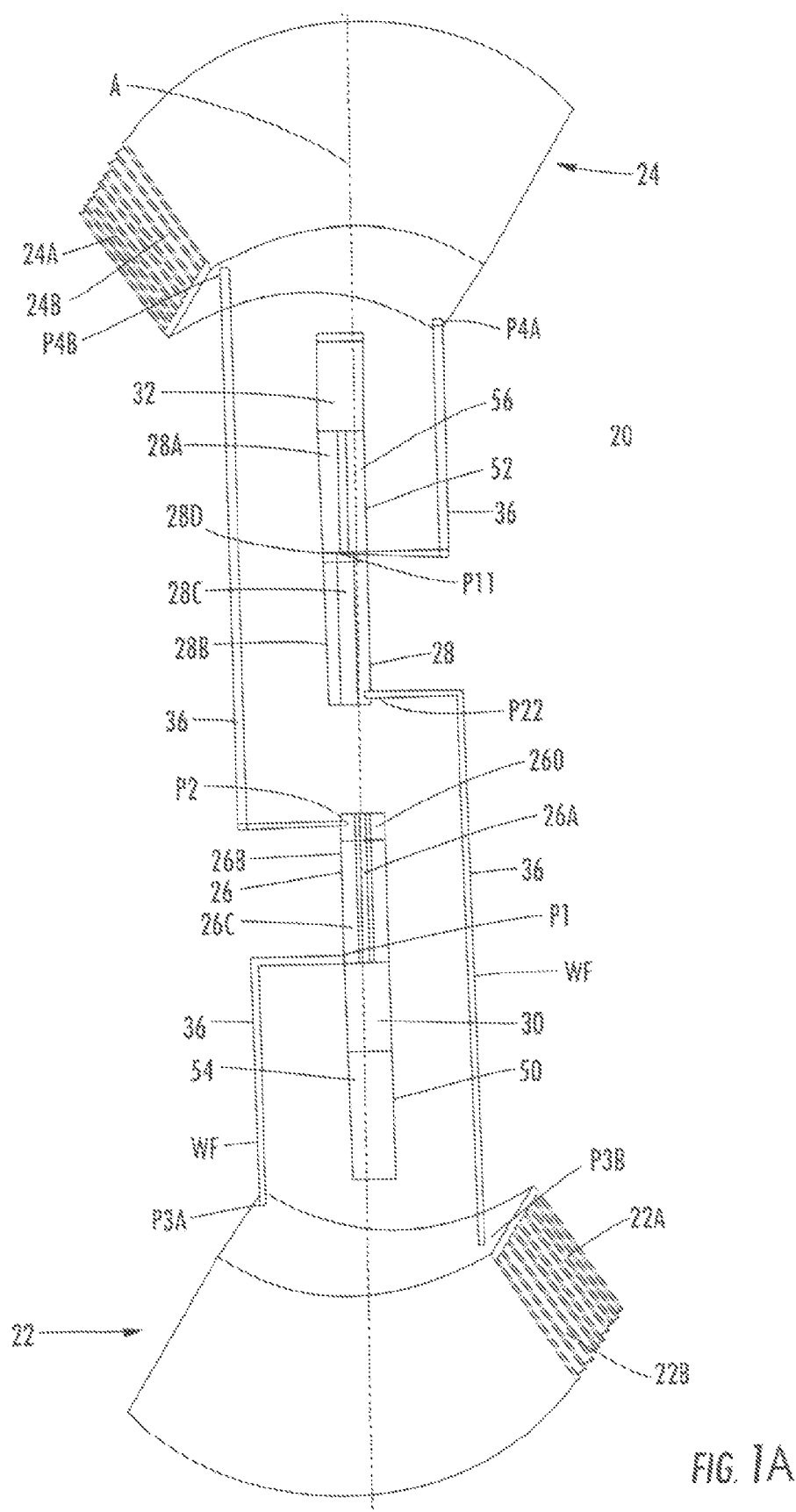
FIG. 1A illustrates a schematic view of an embodiment of a dual heat exchanger unit that can comprise a portion of an embodiment of a thermal expansion drive device according to the subject matter disclosed herein.

FIG. 1A shows a schematic view of an embodiment of a dual heat exchanger unit 20 that can comprise a portion of an embodiment of a thermal expansion drive device and illustrates heat exchangers at opposite ends of dual heat exchanger unit 20 and their relationship with hydraulic cylinders of the dual heat exchanger unit 20 during a high pressure cycle. Each dual heat exchanger unit 20 can comprise a first heat exchanger 22 configured to be heated and cooled by fluids. As shown in FIGS. 1A and 3A-3B, the first heat exchanger 22 can have two exchanger fluid chambers 22A, 22B configured for housing a working fluid WF that is temperature sensitive. Similarly, each dual heat exchanger unit 20 can also comprise a second heat exchanger 24 configured to be heated and cooled by fluids with the second heat exchanger 24 comprising two exchanger fluid chambers 24A, 24B configured for housing the working fluid WF. In particular, in some embodiments as shown in FIGS. 3A and 3B, the two exchanger fluid chambers 22A, 22B, 24A, 24B in the first and second heat exchangers 22, 24 can each comprise an inner exchanger fluid chamber 22A, 24A and an outer exchanger fluid chamber 22B, 24B.

The first heat exchanger 22 and the second exchanger 24 can be positioned on opposite ends 20A, 20B of each dual heat exchanger unit 20 along a linear axis A. Both the first heat exchanger 22 and the second exchanger 24 can be distal from the driven shaft 12. The size and shape of the first and second heat exchangers 22, 24 can vary. For example, the length and the number of fins within first and second heat exchangers 22, 24 in which the various fluid chambers flow working fluid can vary. Referring to FIGS. 3A and 3B, for example, the overall size and radius of the heat exchangers 22, 24 can depend on the load requirements of the thermal expansion drive device 10, volume of the working fluid WF at high pressure volume and low pressure volume, the temperature differential of the first and second fluids FF, SF, the type of working fluid WF used as well as the type of material from which the heat exchangers 22, 24 are fabricated. The purpose of the heat exchangers 22, 24 is to convert the heat energy from a warmer fluid source SF into a high pressure hydraulic output. When the interior working fluid volume of the heat exchangers 22, 24 is at 100 percent and heat is applied, expansion of that working fluid can be expanded to create extreme pressures. Such high pressures can drive the hydraulic cylinders and ultimately the large weights as described below.

Referring to FIGS. 1A and 2, each dual heat exchanger unit 20 can comprise a first hydraulic cylinder 26 having a hydraulic ram 26A and a second hydraulic cylinder 28 having a hydraulic ram 28A. The first hydraulic cylinder 26 can be positioned along the linear axis A between the first heat exchanger 22 and the shaft 12 and the second hydraulic cylinder 28 can be positioned along the linear axis A between the second heat exchanger 24 and the shaft 12. A first weight 30 can be secured to the ram 26A of the first hydraulic cylinder 26 and a second weight 32 can be secured to the ram 28A of the second hydraulic cylinder 28. The first weight 30 can be movable between a position IP closer to the driven shaft 12 when the ram 26A of the first hydraulic cylinder 26 is contracted and a position OP farther away from the driven shaft 12 when the ram 26A of the first hydraulic cylinder 26 is extended. Similarly, the second weight 32 can be movable between a contracted position IP closer to the driven shaft 12 when the ram 28A of the second hydraulic cylinder 28 is contracted and an extended position OP farther away from the driven shaft 12 when the ram 28A of the second hydraulic cylinder 28 is extended.

Each heat exchanger 22, 24 can have two hydraulic connections (described in more detail below). Each of these connections can operate the opposite cycle of the two hydraulic cylinders 26, 28. Thereby, the alignment of the components of each dual heat exchanger unit 20 generally along the linear axis A, the connections between the first and second heat exchangers 22, 24 and the first and second hydraulic cylinders 26, 28, and the placement of the fluid sources that heat and cool the first and second heat exchangers 22, 24 can facilitate the creation of a 180° phase relationship between the respective components of the first and second sides of each dual heat exchanger unit 20. This phase relationship of 180° insures the displacement of the weights 30, 32 between their contracted positions IP and extended positions OP will occur during a timing interval when the weights 30, 32 are at the most vertical point in their rotation.

Figure 1B:
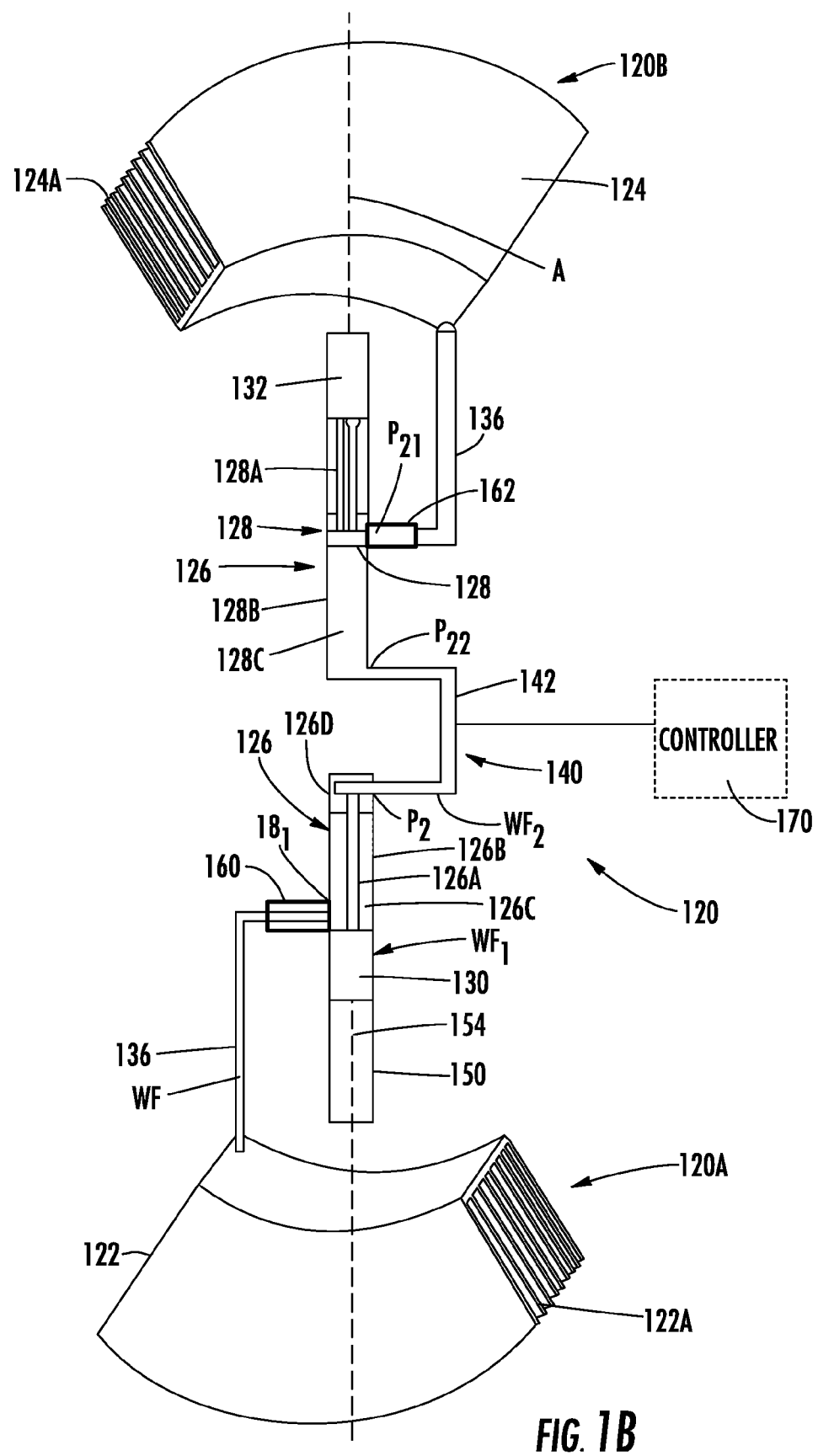
FIG. 1B illustrates a schematic view of another embodiment of a dual heat exchanger unit that can comprise a portion of an embodiment of a thermal expansion drive device according to the subject matter disclosed herein.

FIG. 1B shows another embodiment of a dual heat exchanger unit which is explained further below. While the thermal expansion drive devices disclosed herein can comprise dual heat exchanger units as illustrated in FIG. 1A or FIG. 1B, which is described further below, FIGS. 2, 5A-5D, 8 and 9 will be explained for illustrative purposes with reference to the embodiment of the dual heat exchanger unit shown in FIG. 1A.

Referring to FIG. 2, the thermal expansion drive device 10 can comprise a set of eight dual heat exchanger units 20. The opposing sides of the eight dual heat exchangers 20 with opposing heat exchangers are labeled in FIG. 2 as A1:B1, A2:B2, A3:B3, A4:B4, A5:B5, A6:B6, A7:B7, and A8:B8. These opposing sides in FIG. 2 can also be used to demonstrate 16 different positions in time for their respective operation of a heat exchanger, cylinder and weight unit that comprises one side of a dual heat exchanger unit 20 as the thermal expansion drive device 10 turns. Similarly, FIG. 2 can also be used to demonstrate 8 different positions in time for and the operation of a dual heat exchanger unit 20. In particular, the relationship is shown between the heat exchangers and their hydraulic cylinders and mass weight displacement as the thermal expansion gravity drive device 10 rotates through the heating and cooling cycles. It is to be understood that different thermal expansion drive devices 10 can be have different numbers of dual heat exchanger units 20. For example, 2, 4, 5, 6, 9, 10, 12, 16 or more are examples of number of dual heat exchanger units 20 that can be used in a thermal expansion gravity drive device 10. Similarly, the size and shape of the first and second heat exchangers 22, 24 can vary depending on the number of dual heat exchanger units 20.

The multiple dual heat exchanger units 20 can be centered around the driven shaft 12 to form an outer circumference OC of the thermal expansion drive device 10 with the first and second heat exchangers 22, 24. A first fluid source 40 can be provided at a first location 42 along the travel path TP of the first and second heat exchangers 22, 24 which is positioned proximal to the outer circumference OC formed by the heat exchangers 22, 24. The first fluid source 40 can be configured to provide a first fluid FF to contact the first and second heat exchangers 22, 24 of the set of multiple dual heat exchanger units 20 pass through the first location 42 of the thermal expansion drive device 10 as the driven shaft 12 is rotated. Similarly, a second fluid source 44 can be provided at a second location 46 along the travel path TP of the first and second heat exchangers 22, 24 which is positioned proximal to the outer circumference OC formed by the heat exchangers 22, 24. The second fluid source 44 can be configured to provide a second fluid SF to contact the first and second heat exchangers 22, 24 of the set of multiple dual heat exchanger units 20 as the first and second heat exchangers 22, 24 pass through the second location 46 along the outer circumference OC of the thermal expansion drive device 10 as the driven shaft 12 is rotated.

The first and second fluids FF, SF can be the same or different fluids. For example, the first and second fluids FF, SF can be water. The first and second fluids FF, SF from the first and second fluid sources 40, 44 can be maintained at their respective first and second locations 42 by retainers, diverters or guards, for example, to minimize the mingling of the first fluid FF and second fluid SF. For example, as shown in FIG. 2, the first fluid source 42 can comprise a pool of heated fluid SF that can be maintained in a trough through which the first and second heat exchangers 22, 24 pass. Similarly, as shown in FIG. 2, a second fluid source 44 can comprise a spray nozzle that sprays cooler fluid SF over the first and second heat exchangers 22, 24 as they pass through the second location 46. The spray can pull the second fluid SF from a tank of second fluid as shown in FIG. 2.

This arrangement allows for the heat exchangers 22, 24 at opposite ends of each dual heat exchanger unit 20 to travel through hot and cold water cycles, for example, without the need for camshafts and control valves. The thermal expansion gravity drive device 10, which can, at least in some embodiments, be considered an engine, utilizes moving dual heat exchanger units 20 built onto a frame of the thermal expansion gravity drive device 10. This configuration allows for the timing of the expansion and contraction of the working fluids WF to be controlled by the RPM of the thermal expansion gravity drive device 10 and the temperature differential between the hotter (or warmer) fluid FF and cold (or cooler) fluid SF of the first fluid and second fluid sources 40, 44 (see FIGS. 2, 3A, and 3B).

The first and second fluids FF, SF can be the same or different types of fluid. For example, the first fluid FF and the second fluid SF can be a liquid such as water. A temperature differential can exist between the first fluid FF and the second fluid SF that is great enough to cause the working fluid WF within the respective exchanger fluid chambers 22A, 22B, 24A, 24B to expand and contract to move the hydraulic rams 26A, 28A within the hydraulic cylinders 26, 28. As shown in FIG. 2, a temperature differential between the first fluid FF and the second fluid SF can be created by the first fluid FF being of a higher temperature than the second fluid SF. In some embodiments, the temperature differential between the first fluid FF and the second fluid SF can be about 15° F. In some embodiments, the temperature differential between the first fluid FF and the second fluid SF can be much greater than 15° F. Different working fluids can work with different temperature ranges and with different base temperatures at which the working fluid reacts to either expansion or contract. Thus, the type of working fluid can be chosen based on the pressure it can create, the temperatures at which it will operate and as well the range of temperature needed to produce the necessary pressure differential.

Due to the temperature differential and the expansion and contraction of the working fluid WF to cause the respective hydraulic rams 26A, 28A to extend and contract to move the respective first and second weights 30, 32, the first location 42 and the second location 46 of the respective first and second fluid sources 40, 44 can be positioned to cause the rotation of the driven shaft 12. In particular, the first location 42 through which the first and second heat exchangers 22, 24 pass can be positioned along the outer circumference OC of the thermal expansion drive device 10 relative to the second location 44 such that the first weight 30 connected to the hydraulic ram 26A of the first hydraulic cylinder 26 is in the contracted position when the second weight 32 connected to the hydraulic ram 28A of the second hydraulic cylinder 28 is in the extended position. Similarly, the first weight 30 connected to the hydraulic ram 26A of the first hydraulic cylinder 26 is in the extended position when the second weight 32 connected to the hydraulic ram 28A of the second hydraulic cylinder 28 is in the contracted position. The movement of first and second weights 30, 32 causes the gravitational imbalance that drives the rotation of the driven shaft 12.

In particular, as shown in FIG. 2, the thermal expansion drive device 10 can have an inner orbit IO in which the first and second weights 30, 32 travel when the first and second weights 30, 32 are in their respective contracted position and an outer orbit OO in which the first and second weights 30, 32 travel when the first and second weights 30, 32 are in their respective extended position.

The first and second heat exchangers 22, 24 and the working fluid WF contained therein work in tandem to both extend and contract the hydraulic rams 26A, 28A of the first and second hydraulic cylinders 26, 28 to respectively move the first and second weights 30, 32 between the inner and outer orbits IO, OO. As shown in FIGS. 1A, 2, 5A-5D and 8, within each dual heat exchanger unit 20, when the first heat exchanger 22 is passing through the first location 42 with first fluid FF and the second heat exchanger 24 is passing through the second location 46 with the second fluid SF, the ram 26A of the first hydraulic cylinder 26 can be contracted and the ram 28A of the second hydraulic cylinder 28 can be extended. In particular, the ram 26A of the first hydraulic cylinder 26 can be contracted by the working fluid WF within one of the fluid chambers 22A, 22B in the first heat exchanger 22 that is expanded through heating the working fluid WF by a first fluid FF contacting the first heat exchanger 22 and by the working fluid WF within one of the fluid chambers 24A, 24B in the second heat exchanger 24 that is contracted through withdrawal of heat from the working fluid WF by a second fluid SF contacting the second heat exchanger 24. At the same time, within the same dual heat exchanger unit 20, the ram 28A of the second hydraulic cylinder 28 can be extended by the working fluid WF within the other fluid chamber 24A, 24B in the second heat exchanger 24 being contracted through withdrawal of heat from the working fluid WF by a second fluid SF contacting the second heat exchanger 24 and by the working fluid WF within the other fluid chambers 22A, 22B in the first heat exchanger 22 that is expanded through heating the working fluid WF by a first fluid FF contacting the first heat exchanger 22.

Similarly, when the second heat exchanger 24 is passing through the first location 42 with first fluid FF and the first heat exchanger 22 is passing through the second location 46 with the second fluid SF, the ram 28A of the second hydraulic cylinder 28 can be contracted and the ram 26A of the first hydraulic cylinder 26 can be extended. In particular, the ram 28A of the second hydraulic cylinder 28 can be contracted by the working fluid WF within one of the fluid chambers 24A, 24B in the second heat exchanger 24 that is expanded through heating the working fluid by the first fluid FF contacting the second heat exchanger 24 and by the working fluid WF within one of the fluid chambers 22A, 22B in the first heat exchanger 22 that is contracted through withdrawal of heat from the working fluid WF by the second fluid SF contacting the first heat exchanger 22. At the same time, the ram 26A of the first hydraulic cylinder 26 can be extended by the working fluid WF within the other fluid chambers 22A, 22B in the first heat exchanger 22 that is contracted through withdrawal of heat from the working fluid WF by the second fluid SF contacting the first heat exchanger 22 and by the working fluid WF within the other fluid chamber 24A, 24B in the second heat exchanger 24 that is expanded through heating the working fluid WF by the first fluid FF contacting the second heat exchanger 24. These extension and contractions of the hydraulic rams 26A, 28A are accomplished through the fluid line connections 36 between the respective heat exchangers 22, 24 and the hydraulic cylinders 26, 28 as explained in more detail below.

As shown in FIGS. 1A, 2, 4A and 4B, the dual heat exchanger units can provide housing assemblies in which the weights and hydraulic cylinders can reside. For example, in some embodiments, each dual heat exchanger unit 20 can further comprise a first housing assembly 50 positioned generally along the linear axis A between the first heat exchanger 22 and the shaft 12 and a second housing assembly 52 positioned generally along the linear axis A between the second heat exchanger and the shaft. The first housing assembly 50 can define a first weight chamber 54 in which the first weight 30 is movable and the second housing assembly 52 can define a second weight chamber 56 in which the second weight 32 is movable. The first housing assembly 50 can also hold the first hydraulic cylinder 26 therein and the second housing assembly 52 can hold the second hydraulic cylinder 28 therein.

In some embodiments, the first and second housing assemblies 50 and 52 can comprise metal pipe housings. Such first and second housing assemblies 50 and 52 can thereby enclose the respective hydraulic cylinders 26, 28 and the mass weights 30, 32. Such metal housings can form the weight chambers 54, 56 and enclose the space in which the respective mass weight 30, 32 operate. Each first and second housing assemblies 50 and 52 constitutes an individual component capable of being removed and replaced if necessary. A frame (not shown) can be provided with connections therein so that the first and second housing assemblies 50 and 52 can be connected to the frame. This ability to change the first and second housing assemblies 50 and 52 with the weights and hydraulic cylinders therein allows the first and second housing assemblies 50 and 52 to change depending on the specific load requirements of the thermal expansion drive device 10. FIG. 4A shows a metal pipe housing that can comprise a housing assembly that includes therein the weight and weight's travel space with a bolt connection and bolt connections for hydraulic cylinder. These multiple bolt connections allow for the use of larger weights 30, 32. In FIG. 4B, the housing assembly for weight and hydraulic cylinder shows, weight, weights travel space and hydraulic cylinder in a single metal pipe housing.

The hydraulic cylinders 26, 28 can be conventional hydraulic cylinders known in the art. In some embodiments, for example as shown in FIG. 1A, the first and second hydraulic cylinders 26, 28 can each comprise a body 26B, 28B having a chamber 26C, 28C therein and a sealable opening $O_1$, $O_2$ (see FIG. 4A) through which the ram 26A, 28A can travel. Each cylinder 26, 28 can also comprise a piston 26D, 28D attached to the ram 26A, 28A. Each piston 26D, 28D can reside in the respective chamber 26C, 28C of the respective body 26B, 28B. Each piston 26D, 28D is sealably movable within the respective chamber 26C, 28C of the respective body 26B, 28B to extend and contract the associated ram 26A, 28A. A first port $P_1$, $P_{11}$ can be located at a top portion on each respective body 26B, 28B proximate to the opening through which the ram extends and a second port $P_2$, $P_{22}$ can be located at a bottom portion of each respective body 26B, 28B. The first port $P_1$, $P_{11}$ can be in communication with the respective chamber 26C, 28C of the respective body 26B, 28B so as to provide working fluid WF to press against a front side FS of the respective piston 26D, 28D where the ram 26A, 28A is attached. Meanwhile, the second port $P_2$, $P_{22}$ can be in communication with the respective chamber 26C, 28C of the respective body 26B, 28B so as to provide working fluid WF to press against a back side BS of the respective piston 26D, 28D opposite the front side FS of the piston 26D, 28D.

It is understood that the first and second hydraulic cylinders 26, 28 can have valves that can permit the release of the working fluid WF or the addition of such working fluid WF. Such valves can also be used to change the working fluid WF to permit the proper working fluid to be match to the conditions in which the thermal expansion device 10 operates or change the working fluid WF based on the loss of the fluid's integrity.

Further, sensors can be used that can monitor the fluids and communicate with a controller, such as a computer, that can monitor and aid in operating the thermal expansion device 10. Other sensors associated with the monitoring of aspects such as temperature, integrity or quality, friction, speed, force or the like, of the first and second fluid source, the first and second fluids, the hydraulic cylinders, the frame, the shaft, the weights, the housing assemblies, and the like can provide and can communicate with the controller.

Referring to FIGS. 1A and 2, to accomplish the extension and contraction of the respective hydraulic rams in such embodiments as described above, the first port $P_1$ of the first hydraulic cylinder 26 can be connected by a fluid line 36 to a port $P_{3A}$ of one of the exchanger fluid chambers 22A, 22B in the first heat exchanger 22 and the second port $P_2$ of the first hydraulic cylinder 26 can be connected by a fluid line 36 to a port $P_{4A}$ of one of the exchanger fluid chambers 24A, 24B in the second heat exchanger 24. Similarly, the first port $P_{11}$ of the second hydraulic cylinder 28 can be connected by a fluid line 36 to a port $P_{4B}$ of one of the exchanger fluid chambers 24A, 24B in the second heat exchanger 24 and the second port $P_{22}$ of the second hydraulic cylinder 28 can be connected by a fluid line 36 to a port $P_{3B}$ of one of the exchanger fluid chambers 22A, 22B in the first heat exchanger 26. In this manner, cooled, contracting working fluid WF can work in conjunction with heated, expanding working fluid WF to both extend and contract the rams 26A, 28A of the hydraulic cylinders 26, 28 to move the first and second weights 30, 32 between inner orbit IO and outer orbit OO.

For example, through such connections within each of the dual heat exchanger units 20, the first weight 30 can be moved to the contracted position and the second weight 32 can be moved to the extended position by transferring heat through the first heat exchanger 22 to the working fluid WF within the exchanger fluid chambers 22A, 22B therein to expand the respective working fluid WF and by withdrawing heat through the second heat exchanger 24 from the working fluid WF within the exchanger fluid chambers 24A, 24B therein to expand the respective working fluid WF. Similarly, the first weight 30 can be moved to the extended position and the second weight 32 can be moved to the contracted position by transferring heat through the second heat exchanger 24 to the working fluid WF within the exchanger fluid chambers 24A, 24B therein to expand the respective working fluid WF and by withdrawing heat through the first heat exchanger 22 from the working fluid within the exchanger fluid chambers 22A, 22B therein to expand the respective working fluid WF.

Figure 5A:
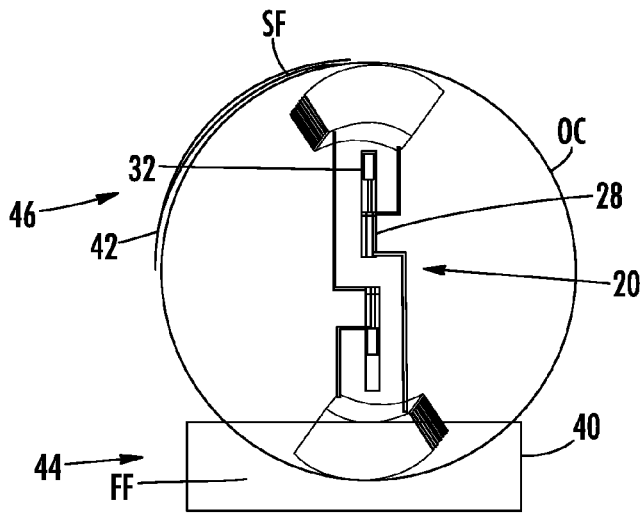
FIGS. 5A-5D illustrate different phases that can be occupied by an embodiment of a dual heat exchanger unit that can comprise a portion of an embodiment of a thermal expansion drive device according to the subject matter disclosed herein.

FIGS. 5A-5D provide further explanation of the concepts described above through examples of four primary phases of an embodiment of a thermal expansion drive device 10. In the embodiment shown, for example, the dual heat exchanger units 20 and the weights 30, 32 therein can be large and the interval between the four primary phases represented can be about 15 seconds and thus, the thermal expansion drive device 10 and its driven shaft 12 can rotate at a speed of 1 RPM. FIG. 5A shows the high pressure output of the expanded working fluid WF from the fluid chambers of the first heat exchanger 22 as the first heat exchanger 22 travels through a first fluid source 40 that can comprise a hot water tank. In this position, the first heat exchanger 22 provides expanded working fluid WF under high pressure to the first hydraulic cylinder 26 in order to contract the ram 26A and pull the first weight 30 into the inner orbit IO. At the same time, the first heat exchanger 22 provides expanded working fluid WF under high pressure to the second hydraulic cylinder 28 in order to extend the ram 28A and push the second weight 32 into the outer orbit OO. The movement of the first and second weights 30, 32 into these positions can be facilitated by the passing of the second heat exchanger 24 through the second fluid source 44 that cools and contracts the working fluid WF supplied to the first and second hydraulic cylinders 26, 28 that opposes the working fluid WF heated by the first heat exchanger 22 reducing the resistance.

Figure 5B:
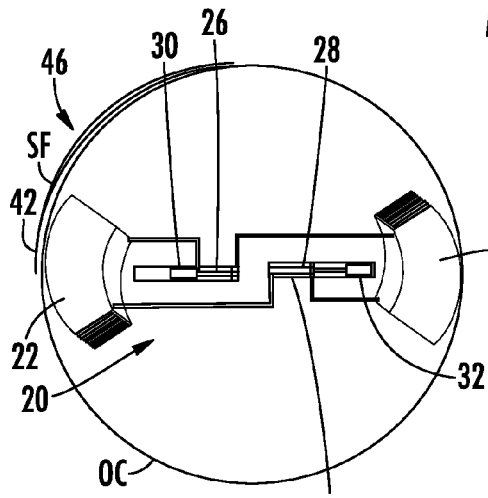

FIG. 5B shows a 90 degree phase shift from the phase in FIG. 5A where the first heat exchanger 22 has entered the cold water cycle by passing the first heat exchanger 22 through the cooler second fluid SF provided by a the second fluid source 44. The temperature of working fluid WF in the fluid chambers of the first heat exchanger 22 begins to drop contracting the working fluid WF in the first heat exchanger 22 and dropping its pressure. The cooling of the working fluid WF in the first heat exchanger 22 continues the contraction process of the working fluid WF through the next 90 degrees. The mass weights 30, 32 are stable, resting on the sides of the respective weight chambers 54, 56 of the respective first and second housing assemblies 50 and 52.

Figure 5C:
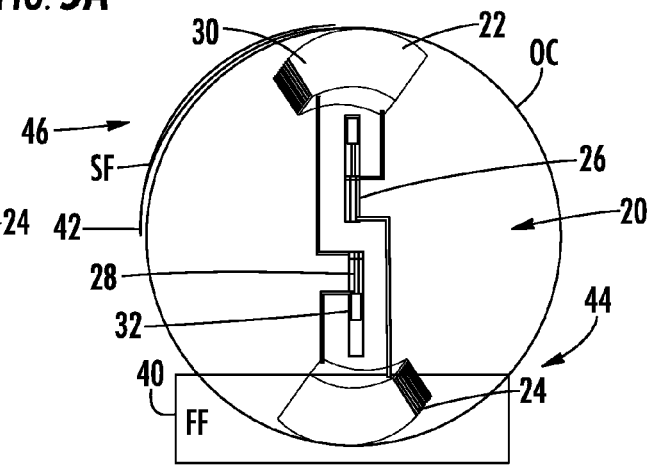

FIG. 5C shows a 180 degree phase shift from the phase in FIG. 5A. FIG. 5C shows the high pressure output of the expanded working fluid WF from the fluid chambers of the second heat exchanger 24 as the second heat exchanger 24 travels through the first fluid source 40 that can comprise a hot water tank. In this position, the second heat exchanger 24 provides expanded working fluid WF under high pressure to the second hydraulic cylinder 28 in order to contract the ram 28A and pull the second weight 32 into the inner orbit IO. At the same time, the second heat exchanger 24 provides expanded working fluid WF under high pressure to the first hydraulic cylinder 26 in order to extend the ram 26A and push the first weight 30 into the outer orbit OO. As above, the movement of the first and second weights 30, 32 can be facilitated by the passing of the first heat exchanger 22 through the second fluid source 44 that cools and contracts the working fluid WF supplied to the first and second hydraulic cylinders 26, 28 that opposes the working fluid WF heated by the second heat exchanger 24 reducing the resistance.

Figure 5D:
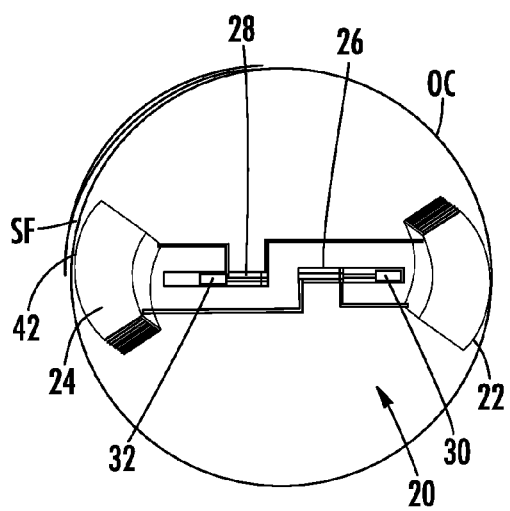

FIG. 5D shows a 270 degrees phase shift from the phase in FIG. 5A, where the second heat exchanger 24 has entered the cold water cycle by passing the second heat exchanger 24 through the cooler second fluid SF provided by the second fluid source 44. The temperature of working fluid WF in the fluid chambers of the second heat exchanger 24 begins to drop contracting the working fluid WF in the second heat exchanger 24 and dropping its pressure. As above, the cooling of the working fluid WF in the second heat exchanger 24 continues the contraction process of the working fluid WF through the next 90 degrees.

Figure 9:
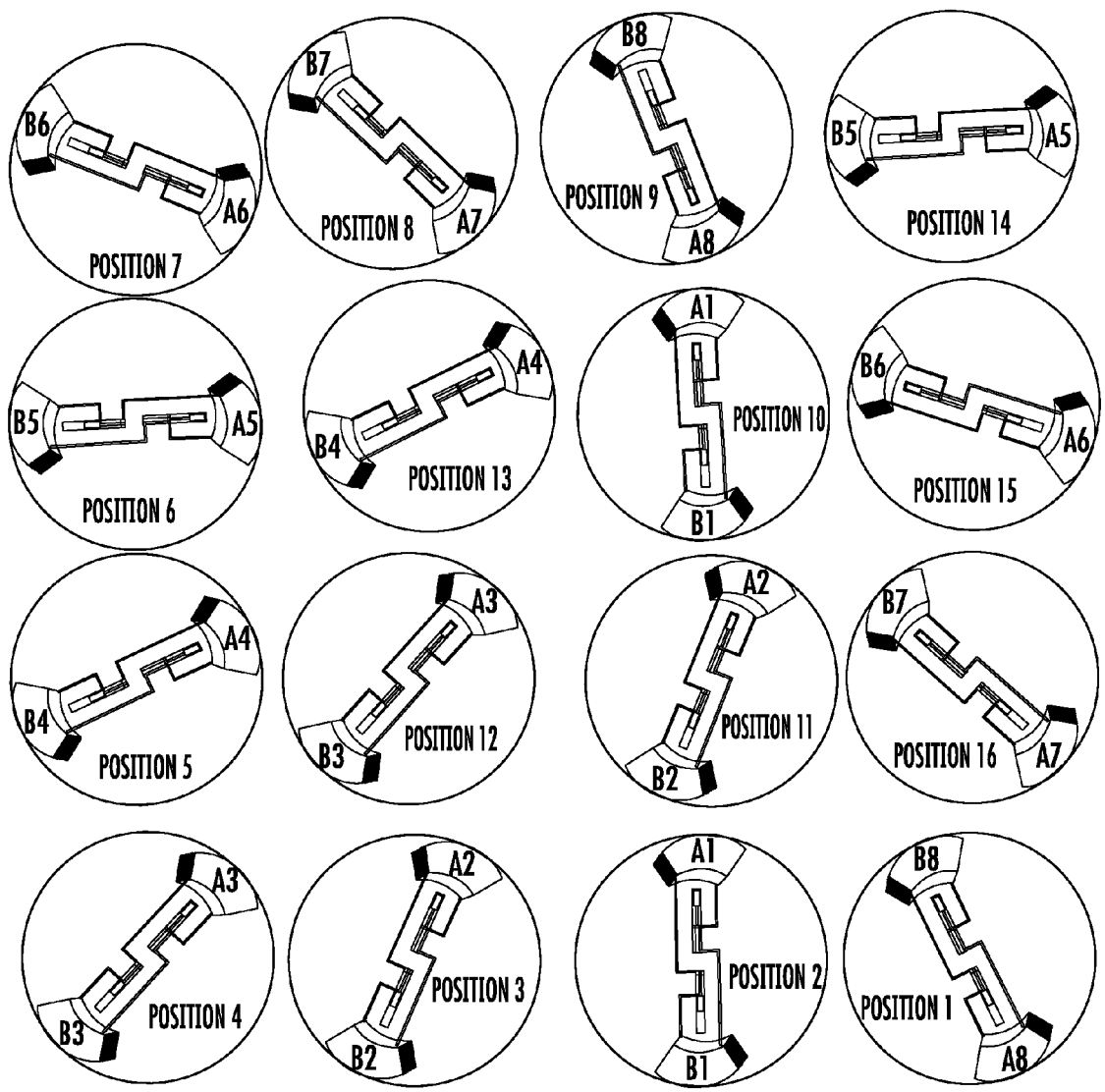
FIG. 9 illustrates different phase positions that can be occupied by an embodiment of a dual heat exchanger unit that can comprise a portion of an embodiment of a thermal expansion drive device according to the subject matter disclosed herein.

FIG. 2 and FIG. 9 can provide further illustrations of the concepts described herein. Due to the explanations provided above, less description of the different phases of the dual heat exchanger units is provided without reference to the above described reference numerals. FIG. 9 provides further information illustrate the high and low pressures provided to the various ports in the first and second hydraulic cylinders at multiple different phase angles represented by positions 1-16 with the heat exchanger position A1, B1, A2, B2, A3, B3, A4, B4, A5, B5, A6, B6, A7, B7, A8 and B8. It will be understood that the foregoing description is for the purpose of illustration only, and not for the purpose of limitation.

Referring to FIG. 9, in position 1, the first heat exchanger at A8 is submerging (or may be completely submerged) in the hot water and the expansion of the working fluid therein begins to move the rams in the first and second cylinders and move the respective first and second weights attached thereto into the inner and outer orbits. In position 2, the first heat exchanger at B1 has completely submerged in the hot water and the working fluid is continuing to expand and pull the first weight into an inner orbit and push the second weight into the outer orbit with the respective first and second cylinders. In position 3, the first heat exchanger at B2 is in the hot water and the working fluid is reaching maximum expansion. The first heat exchanger will begin to exit the hot water and the first weight is reaching the minimum inner orbit and the second weight is reaching the maximum outer orbit. At the same time, in positions 1-4, the second heat exchanger is within the last parts of the cold cycle at A8 and A1 and the working fluid therein is contracting, while the second heat exchanger is through the cold cycle at A2 and A3 with the working fluid therein contracted or still contracting to also facilitate the movement of the first weight as well as the second weight. In position 4, the first heat exchanger at B3 has exited the hot water and the first weight reaches the minimum inner orbit and the second weight reaches the maximum outer orbit.

In position 5 in FIG. 9, the first heat exchanger at B4 is about to enter the cold cycle and the first and second weights are held in their orbits. In position 6, the first heat exchanger at B5 has entered the cold water cycle and the first and second weights will remain stable. As the working fluid in the first heat exchanger contracts, the first and second weights can rest on their respective weight chamber walls and be held in place by gravity. In some embodiments (not shown), bias members such as springs or resilience plastic material can be configured to bias the piston of within the cylinders in one direction or another when pressure generated by the working fluid subsides. In some embodiments as explained below, a control valve can be used on the fluid lines to close flow to help maintain the positions of the weights. In position 7, the first heat exchanger at B6 continues to cool, which thereby continues to cool the working fluid in this heat exchanger. In this embodiment, the first and second weights can continue to be held in place by gravity. In position 8, the first heat exchanger at B7 continues to cool and the working fluid in this heat exchanger continues to contract, while the first and second weights continue to be held in place by gravity. In positions 4-8, the second heat exchangers have exited the cold cycle and the second weight is held at the extend positions at A3, A4, A5, A6, A7 before the second heat exchanger begins entering the hot cycle at A8.

Still referring to FIG. 9, the first heat exchanger at B8 continues to cool in position 9, while the second heat exchanger at A8 is submerging (or may be completely submerged) in the hot water causing the expansion of the working fluid therein to begin to move the rams in the second and first cylinders and move the respective second and first weights attached thereto into the inner and outer orbits. In position 10, the first heat exchanger at A1 has been cooled so that the working fluid has reached its desired temperature and the first heat exchanger is exiting the cold water cycle. Meanwhile, the second heat exchanger at B1 has completely submerged in the hot water and the working fluid is continuing to expand and pull the second weight into an inner orbit and push the first weight into the outer orbit with the respective second and first cylinders. In position 11, the first heat exchanger at A2 has left the cold water cycle and the second heat exchanger at B2 is in the hot water and the working fluid in the second heat exchanger is reaching maximum expansion. The second heat exchanger will begin to exit the hot water and the second weight is reaching the minimum inner orbit and the first weight is reaching the maximum outer orbit. In positions 12-16, the second and first weights remain in their respective orbits in a similar fashion as the description of positions 4-8.

Figure 6:
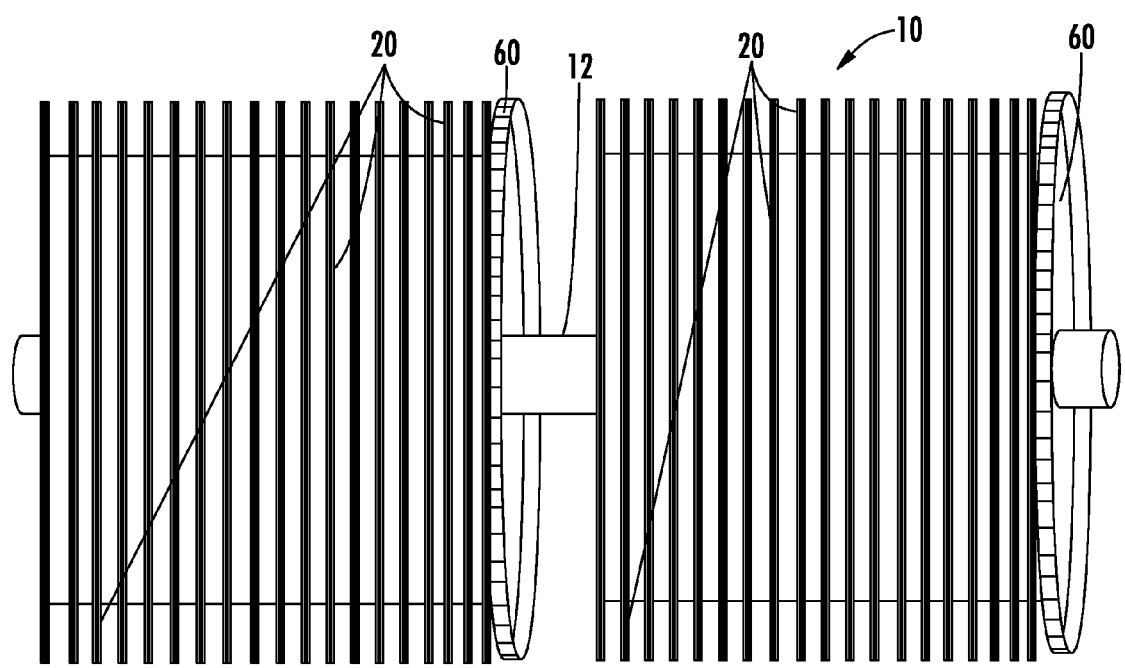
FIG. 6 illustrates a side perspective view of another embodiment of a thermal expansion drive device according to the subject matter disclosed herein.
Figure 7:
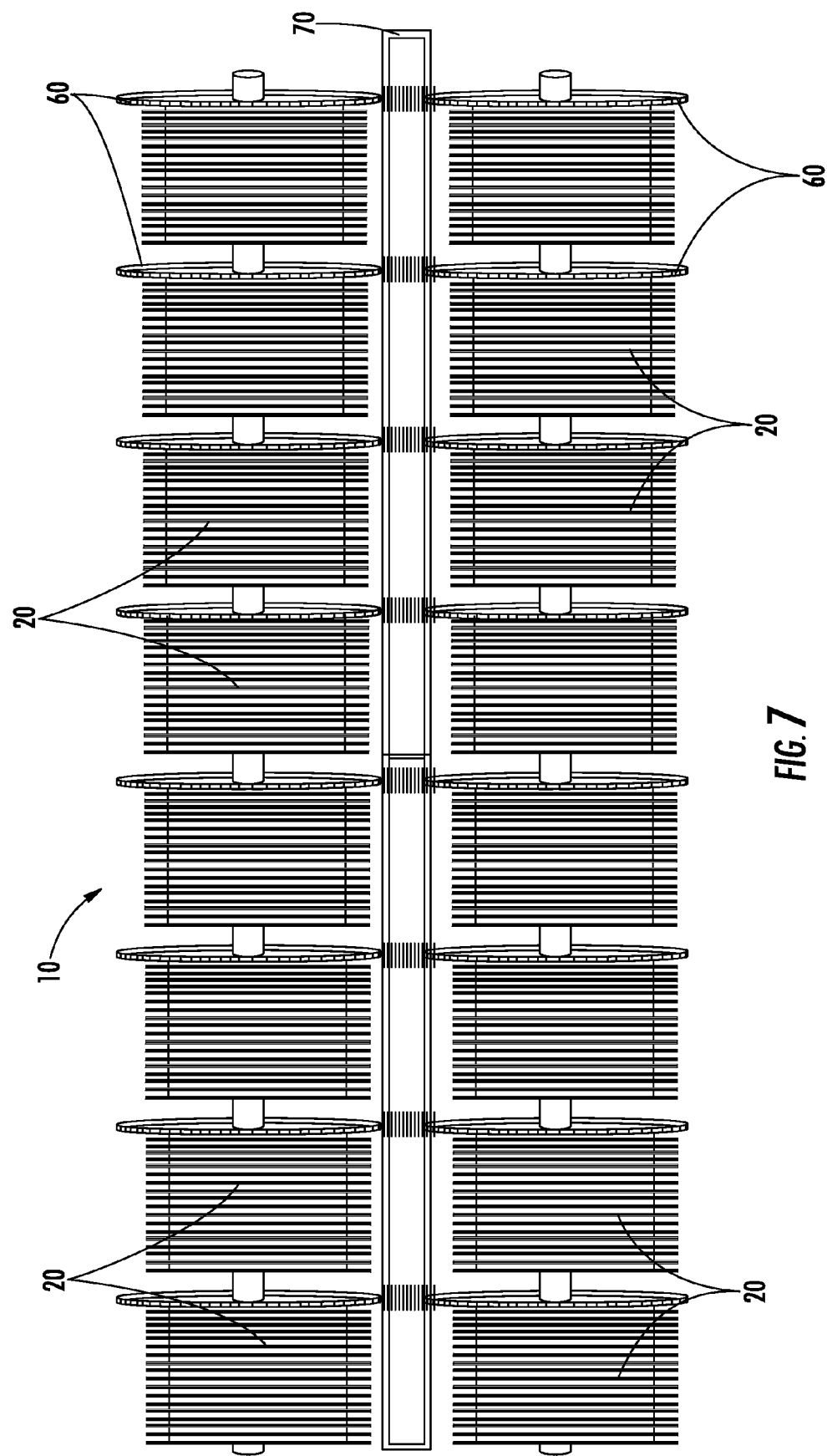
FIG. 7 illustrates a side perspective view of a further embodiment of a thermal expansion drive device according to the subject matter disclosed herein.
Figure 8:
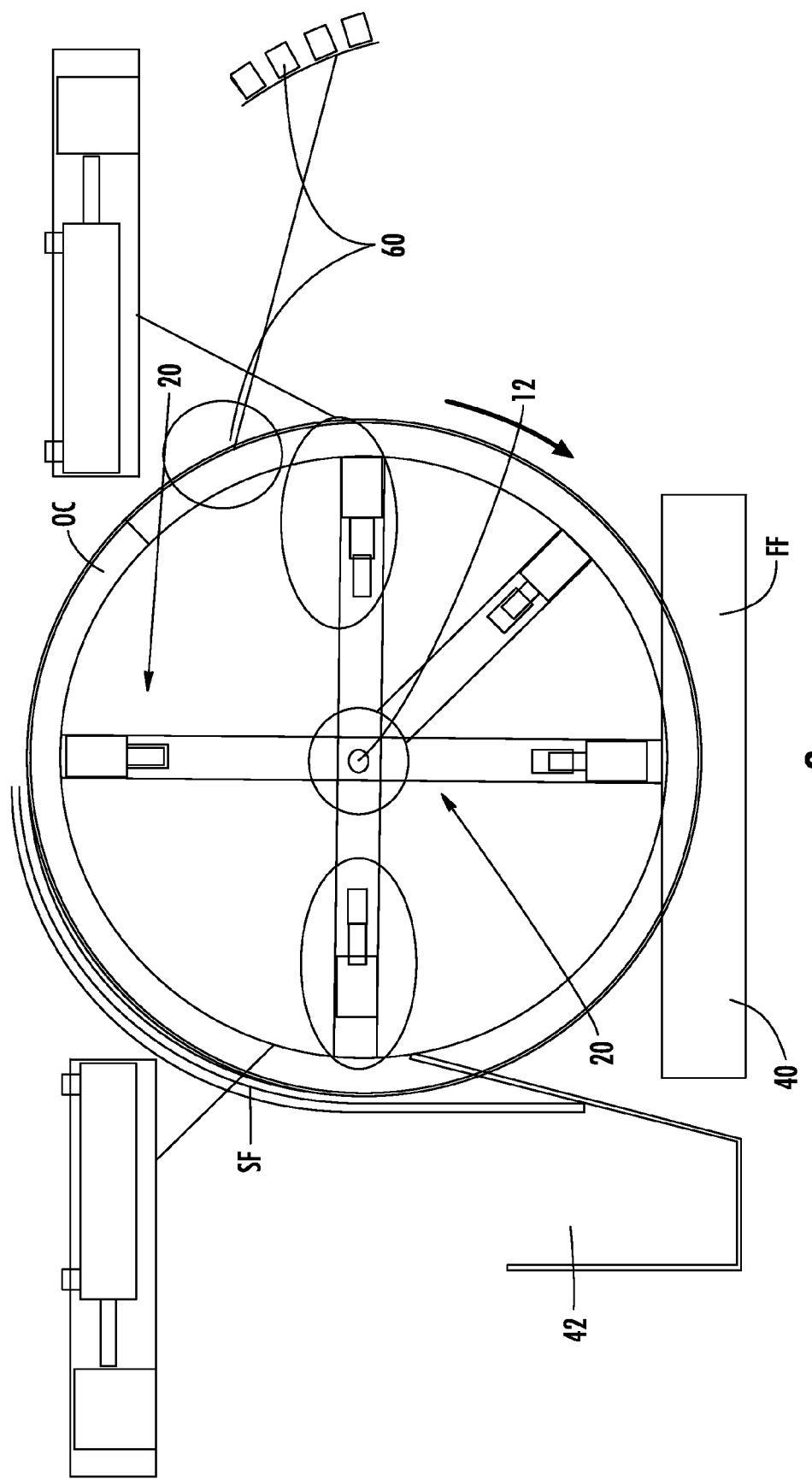
FIG. 8 illustrates a front plan view of an embodiment of a thermal expansion drive device according to the subject matter disclosed herein.

The thermal expansion drive devices disclosed herein can be used to generate power in different ways. For example, as shown in FIGS. 6, 7, and 8, a main gear 60 can be associated with the set of multiple dual heat exchanger units 20 and secured to the driven shaft 12. This main gear 60 can be used to drive a generator shaft 70 as shown in FIG. 7. The main gear can comprise a plurality of teeth as shown and described in FIG. 8. As shown in FIG. 6, one or more additional sets of multiple dual heat exchanger units 20 can be secured to the driven shaft 12. Further, a main gear 60 can be associated with each of the sets of multiple dual heat exchanger units 20 and secured to the driven shaft 12. The embodiment of a thermal expansion drive device 10 shown in FIG. 6 can be considered a multi-stage thermal expansion drive device.

As shown in FIG. 7, one or more additional driven shafts 12 can be provided in some embodiments of the thermal expansion drive device 10 with each driven shaft 12 having one or more sets of multiple dual heat exchanger units 20 secured to the respective driven shafts 12. As with the embodiment shown in FIG. 6, a main gear 60 can be associated with each of the sets of multiple dual heat exchanger units 20 and secured to the respective driven shaft 12. In such embodiments, the main gears 60 can also be used to drive a generator shaft 70. FIG. 7 can represent an embodiment of the thermal expansion drive device 10 that forms a 16 stage engine. Multi-stage thermal expansion drive devices 10, such as engines as shown, can produce energy outputs in the hundreds of megawatts. The drive gears of each individual set of dual heat exchanger units 20 are linked to a main gear to achieve a desired output.

Referring now to FIG. 1B, a schematic view of another embodiment of a dual heat exchanger unit 120 is shown that can comprise a portion of another embodiment of a thermal expansion drive device and illustrates heat exchangers 122, 124 at opposite ends of dual heat exchanger unit 120 and their relationship with hydraulic cylinders of the dual heat exchanger unit 20 as first heat exchanger 122 enters a high pressure cycle. Each dual heat exchanger unit 120 can comprise the first heat exchanger 122 and the second heat exchanger 124 configured to be heated and cooled by fluids. In particular, the first heat exchanger 22 can have an exchanger fluid chamber 122A configured for housing a working fluid $WF_1$ similar to the one shown in FIG. 1A that is temperature sensitive, such that the working fluid $WF_1$ expands when heated and contracts when cooled. Similarly, the second heat exchanger 124 can comprise an exchanger fluid chamber 124A configured for housing the same or similar type of working fluid $WF_1$.

The first heat exchanger 122 and the second exchanger 124 can be positioned on opposite ends 120A, 120B of each dual heat exchanger unit 120 along a linear axis A. Both the first heat exchanger 22 and the second exchanger 24 can be distal from the driven shaft (as shown in FIG. 2 as driven shaft 12, for example). The size and shape of the first and second heat exchangers 122, 124 can vary. For example, the length and the number of fins within first and second heat exchangers 122, 124 that form the fluid chambers 122A, 124A in which the working fluid $WF_1$ flows can vary. The overall size and radius of the heat exchangers 122, 124 can depend on the load requirements of the thermal expansion drive device, volume of the working fluid $WF_1$ at high pressure volume and low pressure volume, the temperature differential of the first and second fluids (as explained above), the type of working fluid $WF_1$ used as well as the type of material from which the heat exchangers 122, 124 are fabricated. As above, the purpose of the heat exchangers 122, 124 is to convert the heat energy from a warmer fluid source into a high pressure hydraulic output. When the interior working fluid volume of the heat exchangers 122, 124 is at 100 percent and heat is applied, expansion of that working fluid can be expanded to create extreme pressures. Such high pressures can drive the hydraulic cylinders and ultimately the large weights as described below.

Each dual heat exchanger unit 120 can comprise a first hydraulic cylinder 126 having a hydraulic ram 126A and a second hydraulic cylinder 128 having a hydraulic ram 128A. As above, the first hydraulic cylinder 126 can be positioned along the linear axis A between the first heat exchanger 122 and the shaft (not shown) and the second hydraulic cylinder 128 can be positioned along the linear axis A between the second heat exchanger 124 and the shaft. A first weight 130 can be secured to the ram 126A of the first hydraulic cylinder 126 and a second weight 132 can be secured to the ram 128A of the second hydraulic cylinder 128. As with the embodiment shown FIGS. 1A and 2, the first weight 130 can be movable between a position closer to the driven shaft (as the weight 130 is shown in FIG. 1B) when the ram 126A of the first hydraulic cylinder 126 is contracted and a position farther away from the driven shaft when the ram 126A of the first hydraulic cylinder 126 is extended. Similarly, the second weight 132 can be movable between a contracted position closer to the driven shaft when the ram 128A of the second hydraulic cylinder 128 is contracted and an extended position (as the weight 132 is shown in FIG. 1B) farther away from the driven shaft when the ram 128A of the second hydraulic cylinder 128 is extended.

As shown in FIG. 1B, the first and second hydraulic cylinders 126, 128 can each comprise a body 126B, 128B having a chamber 126C, 128C therein and a sealable opening through which the ram 126A, 128A can travel. Each hydraulic cylinder 126, 128 can also comprise a piston 126D, 128D attached to the ram 126A, 128A. Each piston 126D, 128D can reside in the respective chamber 126C, 128C of the respective body 126B, 128B. Each piston 126D, 128D can be sealably movable within the respective chamber 126C, 128C of the respective body 126B, 128B to extend and contract the associated ram 126A, 128A.

Each hydraulic cylinder 126, 128 can further comprise first port $P_1, P_{11}$ that can be located at a top portion on each respective body 1268, 128B proximate to the opening through which the ram 126A, 128A extends and a second port $P_2, P_{22}$ that can be located at a bottom portion of each respective body 126B, 128B. The first port $P_1, P_{11}$ can be in communication with the respective chamber 26C, 28C of the respective body 26B, 28B so as to provide and retrieve working fluid $WF_1$ above the piston 126D, 128D to press against a front side of the respective piston 126D, 128D from which the ram 126A, 128A extend. Meanwhile, the second port $P_2, P_{22}$ can be in communication with the respective chamber 126C, 128C of the respective body 126B, 128B so as to provide and retrieve working fluid $WF_1$ beneath the piston 126D, 128D to press against a back side of the respective piston 126D, 128D opposite the front side of the piston 126D, 128D from which the ram 126A, 128A extends.

In the embodiment shown, dual heat exchanger unit 120 can further comprise a first housing assembly 150 positioned generally along the linear axis A between the first heat exchanger 122 and the shaft and a second housing assembly 152 positioned generally along the linear axis A between the second heat exchanger 124 and the shaft. The first housing assembly 150 can define a first weight chamber 154 in which the first weight 130 is movable and the second housing assembly 152 can define a second weight chamber 156 in which the second weight 132 is movable. In some embodiments, the first housing assembly 150 can also hold the first hydraulic cylinder 126 therein and the second housing assembly 152 can hold the second hydraulic cylinder 128 therein.

As shown in FIG. 1B, the dual heat exchanger unit 120 can comprise a pressurized working fluid source 140 that is connected to the first hydraulic cylinder 126 beneath the back side of the hydraulic piston 126D to which the hydraulic ram 126A of the first hydraulic cylinder 126. The pressurized working fluid source 140 is also connected to the second hydraulic cylinder 128 beneath the back side of the hydraulic piston 128D to which the hydraulic ram 128A of the second hydraulic cylinder 126. Thereby, the pressurized working fluid source 140 can provide and retrieve working fluid $WF_2$ below the hydraulic piston 126D of the first hydraulic cylinder 126 and provide and retrieve working fluid $WF_2$ below the hydraulic piston 128D of the second hydraulic cylinder 128.

In some embodiments, the working fluid $WF_2$ in the pressurized working fluid source 140 can be maintained at or close to a constant pressure that is above the pressure created by working fluid $WF_1$ from the exchanger fluid chambers 122A, 124A when the respective heat exchanger 122, 124 has been exposed to a cooler fluid and the working fluid $WF_1$ is contracted. At the same time, this constant pressure of the working fluid $WF_2$ can be below the pressure created by working fluid $WF_1$ from the exchanger fluid chambers 122A, 124A when the respective heat exchanger 122, 124 has been exposed to a hotter fluid and the working fluid $WF_1$ is expanded. In this manner, the working fluid $WF_1$ and the working fluid $WF_2$ can work together to move the respective pistons 126D, 128D and thereby the weights 130, 132 between the contracted position and the extended position as the working fluid $WF_1$ in the respective heat exchangers 122, 124 expand and contract.

To work in this manner, the first heat exchanger 122 can have a connection to the first hydraulic cylinder 126 and the second heat exchanger 124 can have a connection to the second hydraulic cylinder 128. For example, the exchanger fluid chamber 122A of the first heat exchanger 122 can be connected to the first hydraulic cylinder 126 to provide and retrieve working fluid $WF_1$ in the first hydraulic cylinder 126 in the chamber 126C above the front side of the hydraulic piston 126D from which the hydraulic ram 126A extends. Similarly, the exchanger fluid chamber 124A of the second heat exchanger 124 can be connected to the second hydraulic cylinder 128 to provide and retrieve working fluid $WF_1$ in the second hydraulic cylinder 128 in the chamber 128C above the front side of the hydraulic piston 128D from which the hydraulic ram 128A extends.

The connections between pressurized working fluid source 140 and the hydraulic cylinders 126, 128 and between the respective heat exchangers 122, 124 and the hydraulic cylinders 126, 128 can thereby operate the opposite cycle of the two hydraulic cylinders 126, 128. Thus, the alignment of the components of each dual heat exchanger unit 120 generally along the corresponding linear axis A, the above described connections, and the placement of the fluid sources that would heat and cool the first and second heat exchangers 122, 124 can facilitate the creation of a 180° phase relationship between the respective components of the first and second sides of each dual heat exchanger unit 120. This phase relationship of 180° insures the displacement of the weights 130, 132 between their contracted positions and extended positions will occur during a timing interval when the weights 130, 132 are at the most vertical point in their rotation.

In particular, to accomplish the extension and contraction of the respective hydraulic rams for dual heat exchangers shown in FIG. 1B, the first port $P_1$ of the first hydraulic cylinder 126 can be connected by a fluid line 136 to a port of the exchanger fluid chamber 122A in the first heat exchanger 122 and the second port $P_2$ of the first hydraulic cylinder 126 can be connected by a fluid line 142 of the pressurized working fluid source 140. Similarly, the first port $P_{11}$ of the second hydraulic cylinder 128 can be connected by a fluid line 136 to a port of the exchanger fluid chambers 124A in the second heat exchanger 124 and the second port $P_{22}$ of the second hydraulic cylinder 28 can be connected by the fluid line 142 of the pressurized working fluid source 140.

For example, through such connections within the dual heat exchanger unit 120, the first weight 130 can be moved to the contracted position and the second weight 132 can be moved to the extended position by transferring heat through the first heat exchanger 122 to the working fluid $WF_1$ within the exchanger fluid chambers 122A therein to expand the respective working fluid $WF_1$ and by withdrawing heat through the second heat exchanger 124 from the working fluid $WF_1$ within the exchanger fluid chambers 124A therein to expand the respective working fluid $WF_1$ while the working fluid $WF_2$ can be maintained at a pressure between the pressures created by the working fluid $WF_1$ within the respective heat exchangers 122, 124. Similarly, the first weight 130 can be moved to the extended position and the second weight 132 can be moved to the contracted position by transferring heat through the second heat exchanger 124 to the working fluid $WF_1$ within the exchanger fluid chambers 124A therein to expand the respective working fluid $WF_1$ and by withdrawing heat through the first heat exchanger 122 from the working fluid within the exchanger fluid chambers 122A therein to expand the respective working fluid $WF_1$.

In some embodiments, the pressurized working fluid source 140 can comprise a line with a constant amount of the working fluid $WF_2$. The amount of the working fluid $WF_2$ can be enough to allow the pistons 126D, 128D to be moved back and forth within the chambers 126C, 128C of the hydraulic cylinders 126, 128. In some embodiments, the pressurized working fluid source 140 can comprise a reservoir (not shown) for housing the working fluid $WF_2$ that can be maintained at or near a constant pressure with the aid of a controller 170.

As shown in the embodiment in FIG. 1B, the fluid line 136 connecting the exchanger fluid chamber 122A of the first heat exchanger 122 to the first hydraulic cylinder 126 can have a control valve 160 thereon. Also, the fluid line 136 connecting the exchanger fluid chamber 124A of the second heat exchanger 124 to the second hydraulic cylinder 128 can have a control valve thereon. These control valves 160, 162 can facilitate control of the flow of the working fluid $WF_1$ between the respective heat exchangers 122, 124 and the corresponding hydraulic cylinders 126, 128. The controller 170 can be in operable communication with the control valves 160, 162 to open and close them at the correct times and intervals.

In this manner, the control valves 160, 162 can be used to lock the weights 130, 132 at their highest and lowest points in their respective extended and contracted positions until the heat exchangers 122, 124 enter a new cycle. Thus, when a heat exchanger is leaving a heating source or cooling source, the controller 170 can close the control valves 160, 162 with the working fluids are at their peaks. The controller 170 can then open the control valves 160, 162 when one of the heat exchangers 122, 124 enter the next heating source, for example. In this manner, the control valves 160, 162 can be used to help hold the weights at their maximum contracted or extended position by the controller 170 closing the control valves to hold the working fluid within the chamber of the respective hydraulic cylinder or the working fluid out of the chamber of the respective hydraulic cylinder depending on the position of the dual heat exchanger unit similar to the positions illustrated in FIGS. 2 and 9.

The controller 170 is shown in dotted lines in schematic form and can be placed locally on the thermal expansion drive device or can be remotely located. A remotely located controller 170 can send signals to the control valves through wire or wireless communications. Further, the control valves can have sensor thereon that communicate with the controller 170.

In summary, thermal expansion drive devices are provided. A thermal expansion drive device can comprise a driven shaft configured to rotate and multiple dual heat exchanger units centered around the driven shaft. The multiple dual heat exchanger units can be configured to drive rotation of the driven shaft through the creation of a gravitational imbalance in the thermal expansion drive device as portions of the multiple dual heat exchanger units are heated and cooled.

In some embodiments, each of the dual heat exchanger units of the thermal expansion drive device can comprise a first heat exchanger and a second heat exchanger configured to be heated and cooled by fluids. The first heat exchanger and the second exchanger can be positioned on opposite ends of the respective dual heat exchanger unit along a linear axis with both the first heat exchanger and the second heat exchanger being distal from the driven shaft. The first heat exchanger of each respective dual heat exchanger unit can comprise at least one exchanger fluid chamber configured for housing working fluid. Similarly, the second heat exchanger can comprise at least one exchanger fluid chamber configured for housing working fluid.

Each of the dual heat exchanger units of the thermal expansion drive device can also comprise a first hydraulic cylinder having a hydraulic ram and a piston and a second hydraulic cylinder having a hydraulic ram and a piston. The first hydraulic cylinder can be connected to the first heat exchanger to provide working fluid to and from the first hydraulic cylinder and the first hydraulic cylinder positioned along the linear axis between the first heat exchanger and the shaft. Similarly, the second hydraulic cylinder can be connected to the second heat exchanger to provide working fluid to and from the second hydraulic cylinder and the second hydraulic cylinder can be positioned along the linear axis between the second heat exchanger and the shaft.

Additionally, each of the dual heat exchanger units of the thermal expansion drive device can comprise a first weight secured to the ram of the first hydraulic cylinder and a second weight secured to the ram of the second hydraulic cylinder. The first weight can be movable between a position closer to the driven shaft when the ram of the first hydraulic cylinder is contracted and a position farther away from the driven shaft when the ram of the first hydraulic cylinder is extended. Similarly, the second weight can be movable between a contracted position closer to the driven shaft when the ram of the second hydraulic cylinder is contracted and an extended position farther away from the driven shaft when the ram of the second hydraulic cylinder is extended.

In some embodiments of the thermal expansion drive device, the first heat exchanger of each of the dual heat exchanger unit can comprise two exchanger fluid chambers configured for housing working fluid and the second heat exchanger comprises two exchanger fluid chambers configured for housing working fluid. One of the two exchanger fluid chambers of the first heat exchanger can be connected to the first hydraulic cylinder to provide and retrieve working fluid on one side of the hydraulic piston therein. The other of the two exchanger fluid chambers of the first heat exchanger can be connected to the second hydraulic cylinder to provide and retrieve working fluid on one side of the hydraulic piston therein. Additionally, one of the two exchanger fluid chambers of the second heat exchanger is connected to the second hydraulic cylinder to provide and retrieve working fluid on a side of the hydraulic piston therein opposite the side of hydraulic piston of the second hydraulic cylinder to which the exchanger fluid chamber of the first heat exchanger is connected and the other of the two exchanger fluid chambers of the second heat exchanger is connected to the first hydraulic cylinder to provide and retrieve working fluid on one side of the hydraulic piston therein opposite the side of hydraulic piston of the second hydraulic cylinder to which the exchanger fluid chamber of the first heat exchanger is connected.

In some embodiments, the two exchanger fluid chambers in the first heat exchanger can comprise an inner exchanger fluid chamber and an outer exchanger fluid chamber. Similarly, the two exchanger fluid chambers in the second heat exchanger can comprise an inner exchanger fluid chamber and an outer exchanger fluid chamber.

In some embodiments, each dual heat exchanger unit can comprise a first housing assembly positioned along the linear axis between the first heat exchanger and the shaft and a second housing assembly positioned along the linear axis between the second heat exchanger and the shaft. The first housing assembly can define a first weight chamber in which the first weight is movable and the second housing assembly can define a second weight chamber in which the second weight is movable. In such embodiments, the first housing assembly can hold the first hydraulic cylinder therein and the second housing assembly can hold the second hydraulic cylinder therein. Further, the first and second hydraulic cylinders can each comprise a body having a chamber therein and a sealable opening through which the ram travels, a piston attached to the ram and residing in the chamber of the body. The piston sealably can be movable within the chamber of the body to extend and contract the ram. The first and second hydraulic cylinders can also each comprise a first port located at a top portion on the body and a second port located at a bottom portion of the body. The first port can be in communication with the chamber of the body so as to provide working fluid to press against a front side of the piston where the ram is attached. The second port can be in communication with the chamber of the body so as to provide working fluid to press against a back side of the piston opposite the front side of the piston.

Within each dual heat exchanger unit, the ram of the first hydraulic cylinder can be contracted by the working fluid within one of the fluid chambers in the first heat exchanger that is expanded through heating the working fluid by a first fluid contacting the first heat exchanger and by the working fluid within one of the fluid chambers in the second heat exchanger that is contracted through withdrawal of heat from the working fluid by a second fluid contacting the second heat exchanger. Similarly, the ram of the second hydraulic cylinder can be contracted by the working fluid within one of the fluid chambers in the second heat exchanger that is expanded through heating the working fluid by a first fluid contacting the second heat exchanger and by the working fluid within one of the fluid chambers in the first heat exchanger that is contracted through withdrawal of heat from the working fluid by a second fluid contacting the first heat exchanger.

Alternatively, the ram of the first hydraulic cylinder can be extended by the working fluid within one of the fluid chambers in the first heat exchanger that is contracted through withdrawal of heat from the working fluid by a second fluid contacting the first heat exchanger and by the working fluid within one of the fluid chambers in the second heat exchanger that is expanded through heating the working fluid by a first fluid contacting the second heat exchanger. Similarly, the ram of the second hydraulic cylinder can be extended by the working fluid within one of the fluid chambers in the second heat exchanger that is contracted through withdrawal of heat from the working fluid by a second fluid contacting the second heat exchanger and by the working fluid within one of the fluid chambers in the first heat exchanger that is expanded through heating the working fluid by a first fluid contacting the first heat exchanger.

In some embodiments, each of the dual heat exchanger units can comprise a pressurized working fluid source that can be connected to the first hydraulic cylinder beneath a back side of the hydraulic piston opposite a front side from which the hydraulic ram of the first hydraulic cylinder extends to provide and retrieve working fluid below the hydraulic piston of the first hydraulic cylinder. Similarly, the pressurized working fluid source can be connected to the second hydraulic cylinder beneath a back side of the hydraulic piston opposite a front side from which the hydraulic ram of the second hydraulic cylinder to provide and retrieve working fluid below the hydraulic piston of the second hydraulic cylinder. In such embodiments, the exchanger fluid chamber of the first heat exchanger can be connected to the first hydraulic cylinder to provide and retrieve working fluid in the first hydraulic cylinder on the front side of the hydraulic piston from which the hydraulic ram extends. Additionally, the exchanger fluid chamber of the second heat exchanger can be connected to the second hydraulic cylinder to provide and retrieve working fluid in the second hydraulic cylinder on the front side of the hydraulic piston from which the hydraulic ram extends.

In such embodiments, each of the dual heat exchanger units can comprise a fluid line connecting the exchanger fluid chamber of the first heat exchanger to the first hydraulic cylinder. Additionally, each of the dual heat exchanger units can comprise a fluid line connecting the exchanger fluid chamber of the second heat exchanger to the second hydraulic cylinder. Control valves can be provided on these fluid lines to facilitate control of the flow of the working fluid between the respective heat exchangers and the corresponding hydraulic cylinders. A controller can be in operable communication with the controller valve.

The multiple dual heat exchanger units of the thermal expansion drive device can be centered around the driven shaft to form an outer circumference of the thermal expansion drive device with the first and second heat exchangers. The thermal expansion drive device can further comprise a first fluid source configured to provide a first fluid to contact the first and second heat exchangers of multiple dual heat exchanger units as the first and second heat exchangers pass through a first location along the outer circumference of the thermal expansion drive device as the driven shaft is rotated. The thermal expansion drive device can also comprise a second fluid source configured to provide a second fluid to contact the first and second heat exchangers of the multiple dual heat exchanger units as the first and second heat exchangers pass through a second location along the outer circumference of the thermal expansion drive device as the driven shaft is rotated. The thermal expansion drive device can also comprise retainers, diverters, and/or guards for both the first fluid source and the second fluid source to minimize mingling of the first fluid and second fluid.

A temperature differential can exist between the first fluid and the second fluid that is great enough to cause the working fluid within the respective exchanger fluid chambers to expand and contract to move the hydraulic rams within the hydraulic cylinders. A temperature differential between the first fluid and the second fluid can be created by the first fluid being of a higher temperature than the second fluid. For example, a temperature differential between the first fluid and the second fluid can be about 10° F. or greater.

The first location through which the first and second heat exchangers pass can be positioned along the outer circumference of the thermal expansion drive device relative to the second location. Thereby, in such embodiments, the first weight connected to the hydraulic ram of the first hydraulic cylinder is in the contracted position when the second weight connected to the hydraulic ram of the second hydraulic cylinder is in the extended position. Furthermore, the first weight connected to the hydraulic ram of the first hydraulic cylinder is in the extended position when the second weight connected to the hydraulic ram of the second hydraulic cylinder is in the contracted position.

The thermal expansion drive device can additionally comprise an inner orbit in which the first and second weights travel when the first and second weights are in their respective contracted position and an outer orbit in which the first and second weights travel when the first and second weights are in their respective extended position.

In some embodiments, the thermal expansion drive device can comprise a main gear associated with the set of multiple dual heat exchanger units and secured to the driven shaft, the main gear configured to drive a generator shaft. In some embodiments, the thermal expansion drive device can comprise one or more additional sets of multiple dual heat exchanger units secured to the driven shaft and a main gear associated with each of the sets of multiple dual heat exchanger units and secured to the driven shaft. In some embodiments, the thermal expansion drive device can comprise one or more additional driven shafts with each driven shaft having one or more sets of multiple dual heat exchanger units secured to the respective driven shafts and a main gear associated with each of the sets of multiple dual heat exchanger units and secured to the respective driven shaft, wherein the main gears are used to drive a generator shaft.

A method of rotating a thermal expansion drive device is also provided. The method can include providing a thermal expansion drive device that comprises a driven shaft configured to rotate and multiple dual heat exchanger units centered around the driven shaft. The multiple dual heat exchanger units can be configured to drive rotation of the driven shaft through the creation of a gravitational imbalance in the thermal expansion drive device as portions of the multiple dual heat exchanger units are heated and cooled. Each multiple dual heat exchanger unit can comprise a first heat exchanger and a second heat exchanger on opposing ends of the multiple dual heat exchanger unit. The first and second heat exchangers of the multiple dual heat exchanger units can be exposed to a first fluid at a first temperature at a first location. Additionally, the first and second heat exchangers of the multiple dual heat exchanger units can be exposed to a second fluid at a second temperature at a second location to create the gravitational imbalance. The gravitational imbalances thereby cause the driven shaft to rotate.

When in operation as described above, the two thermal heat exchangers in each dual heat exchanger unit can contain a working fluid that is capable of expanding and contracting to and from a desired volume. Each dual heat exchanger unit can include two hydraulic cylinders that are capable of displacing a weight to and from a given distance and that are each connected to the two thermal heat exchangers by hydraulic lines. Each dual heat exchanger unit can comprise a frame that holds a first thermal heat exchanger and a first cylinder 180 degrees apart from a second thermal heat exchanger and a second cylinder. This arrangement can allow for the proper timing of these assemblies as they travel through the hot and cold cycles and displace their weights between their respective orbits. These dual and opposing heat exchangers operate the two different hydraulic cylinders opposite each other. In this way, the thermal heat exchanger and hydraulic cylinder of the dual heat exchanger unit entering the hot cycle and the other thermal heat exchanger and hydraulic cylinder of the dual heat exchanger unit that is 180 degrees out of phase and leaving the cold cycle can displace first and second weights between an inner orbit and an outer orbit. Thereby, a gravitational imbalance in the thermal expansion drive device can be created by the dual heat exchanger units therein that are positioned in different phase positions relative to each other. This gravitational imbalance, in turn, causes gravitational forces to correct that imbalance. Thereby, the gravitational force will cause a rotation in the frame to correct that imbalance.

As the frame rotates, each thermal heat exchanger will travel through the hot cycle expanding the working fluid in the respective thermal heat exchanger to drive the hydraulic cylinders associated with that thermal heat exchanger to displace the weight associate with the respective cylinder into a different orbit. Each thermal heat exchanger exits the hot cycle with the weights held in place by the respective hydraulic cylinder. As the thermal expansion drive device continues to rotate, each thermal heat exchanger will enter a cold cycle. At this time, the working fluid therein will begin to cool and contract. This contraction will cause a drop in pressure but may not affect the position of the weights as they are no longer held in place by the hydraulic cylinder but rather by frictional and gravitational forces. In particular, the weights are now being held in place by the respective housing assembly as the thermal expansion drive device continues to rotate. When each thermal heat exchanger is cooled to cause a sufficient reduction in the working fluid volume, the thermal heat exchanger will exit the cold cycle.

At this point, the expansion of the working fluid of the opposing thermal heat exchanger of the respective dual heat exchanger unit begins to occur as that thermal heat exchanger enters the hot cycle. The hydraulic cylinders within the respective dual heat exchanger unit will now displace the weights into the converse orbit. The thermal expansion drive device is half way through one rotation at this point with the opposing thermal heat exchanger experiencing the same cycle steps described above with respective to the cold cycle as the rotation is completed. In some embodiments, when the respective opposing weights reach 12 o'clock and 6 o'clock, the weights are at about 50% displacement. By the time the weights reach 1 o'clock, the weights have reached full displacement. At this point, the thermal expansion drive device is at full mass weight displacement.

The torque of a thermal expansion drive device 10 can depend on the size of the thermal expansion drive device 10 and the size of the weights used therein. In some embodiments, the torque of a thermal expansion drive device 10 can be calculated by the following formula:

$$T = W \times D \times 2 \times N_W \times t_R \times 60 \times E$$

where:
T=the torque of a thermal expansion drive device;
W=size of a mass weight;
D=the distance each weight travels in the cylinder in feet (D is multiplied by 2 because the weight travels from the outer orbit into an inner orbit then from an inner orbit back to the outer orbit);
$N_W$=the number of weights on any given thermal expansion drive device;
$t_R$ the period of rotation in minutes ($t_R$ is multiplied by 60 to convert the time to hours); and
E=the efficiency of the thermal expansion drive device.

For example, hypothetically assume that mass weights of 20 ton or roughly 40,000 lbs. are used in a thermal expansion drive device. A displacement of 5 feet equals 200,000 foot-lbs. of displacement, which if multiplied by 2 equals 400,000 foot-lbs. of displacement. 400,000 foot lbs. of displacement multiplied by 60 weights on the frame equals 24,000,000 foot-lbs. of displacement. 24,000,000 foot-lbs. of displacement multiplied by rpm of 1 and then multiplied by 60 minutes to convert the measurement to an hourly basis equals 1,440,000,000 foot-lbs. This number multiplied by a hypothetical efficiency of 0.9 equals 1,296,000,000 foot-lbs. of force in an hour.

Further, the temperature difference doesn't have to be that extreme, because the thermal expansion of a working fluid has a wide range in which to operate. For example, take a small pond or lake too small to provide hydroelectric power, but ideal in that surface water and deep water can have a substantial thermal difference. Some of the water can be diverted to a solar water heater to increase the thermal difference. This water can be used in the thermal expansion side of the thermal expansion drive device. The unheated water is used in the cold side of thermal expansion drive device. A pond that may have been able to produce a few kilowatts of hydroelectric power now can produce hundreds of kilowatts or maybe even megawatts of power. When necessary, external heat can be utilized to insure such a power plant provides 24 hour uninterrupted power to maximize power production.

In another hypothetical example where an appropriate working fluid is found and used, a cold fluid source can be derived from the cold air, for example, an air temperature of −20° F. and be used to cool the heat exchangers and the working fluid therein. Meanwhile, a warmer energy source of sea water having a temperature of 30° F. can be provided to create a temperature differential of 50° F. between the hot and cold source. With an unlimited supply of relatively warmer 30° F. sea water, sufficient energy is present to supply power to a town or city in an arctic area through much of the winter. Conversely, using the same or different working fluid during the summer months, colder sea water can be provided as a cooling fluid and the warmer air can be used as a heating fluid to operate the thermal expansion drive device. As stated, the type of working fluids may vary depending on the specific operating conditions. For example, if the sea water is the heating fluid source at around 30° F. and the air temperature is −20° F., suitable fluids will have to be used under extreme conditions. Such examples demonstrate that temperature differential can be a more determinative feature for using the thermal expansion drive devices than the ability to provide a first fluid with a "high" temperature.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A method of rotating a thermal expansion drive device, the method comprising:
providing a thermal expansion drive device comprising:
a driven shaft configured to rotate; and multiple dual heat exchanger units centered around the driven shaft and configured to drive rotation of the driven shaft through the creation of a gravitational imbalance in the thermal expansion drive device as portions of the multiple dual heat exchanger units are heated and cooled, each multiple dual heat exchanger unit com- prising a first heat exchanger and a second heat exchanger on opposing ends of the multiple dual heat exchanger unit, each of the multiple dual heat exchanger unit comprising:
a first heat exchanger configured to be heated and cooled by fluids, the first heat exchanger comprising two exchanger fluid chambers configured for housing working fluid;
a second heat exchanger configured to be heated and cooled by fluids, the second heat exchanger comprising two exchanger fluid chambers configured for housing working fluid; the first heat exchanger and the second heat exchanger positioned on opposite ends of the dual heat exchanger unit along a linear axis, both the first heat exchanger and the second heat exchanger distal from the driven shaft;
a first hydraulic cylinder having a hydraulic ram, the first hydraulic cylinder positioned along the linear axis between the first heat exchanger and the driven shaft;
a second hydraulic cylinder having a hydraulic ram, the second hydraulic cylinder positioned along the linear axis between the second heat exchanger and the driven shaft;
a first weight secured to the ram of the first hydraulic cylinder, the first weight being movable between a position closer to the driven shaft when the ram of the first hydraulic cylinder is contracted and a position farther away from the driven shaft when the ram of the first hydraulic cylinder is extended; and
a second weight secured to the ram of the second hydraulic cylinder, the second weight being movable between a contracted position closer to the driven shaft when the ram of the second hydraulic cylinder is contracted and an extended position farther away from the driven shaft when the ram of the second hydraulic cylinder is extended; and
exposing the first and second heat exchangers of the multiple dual heat exchanger units to a first fluid at a first temperature at a first location and to a second fluid at a second temperature at a second location to create the gravitational imbalance.

2. A thermal expansion drive device comprising:
a driven shaft configured to rotate; and
a set of multiple dual heat exchanger units centered around the driven shaft and configured to drive rotation of the driven shaft through the creation of a gravitational imbalance in the thermal expansion drive device as portions of the multiple dual heat exchanger units are heated and cooled, each of the multiple dual heat exchanger unit comprising:
a first heat exchanger configured to be heated and cooled by fluids, the first heat exchanger comprising two exchanger fluid chambers configured for housing working fluid;
a second heat exchanger configured to be heated and cooled by fluids, the second heat exchanger comprising two exchanger fluid chambers configured for housing the working fluid;
the first heat exchanger and the second heat exchanger positioned on opposite ends of the dual heat exchanger unit along a linear axis, both the first heat exchanger and the second heat exchanger distal from the driven shaft;
a first hydraulic cylinder having a hydraulic ram, the first hydraulic cylinder positioned along the linear axis between the first heat exchanger and the driven shaft;
a second hydraulic cylinder having a hydraulic ram, the second hydraulic cylinder positioned along the linear axis between the second heat exchanger and the driven shaft;
a first weight secured to the ram of the first hydraulic cylinder, the first weight being movable between a position closer to the driven shaft when the ram of the first hydraulic cylinder is contracted and a position farther away from the driven shaft when the ram of the first hydraulic cylinder is extended; and
a second weight secured to the ram of the second hydraulic cylinder, the second weight being movable between a contracted position closer to the driven shaft when the ram of the second hydraulic cylinder is contracted and an extended position farther away from the driven shaft when the ram of the second hydraulic cylinder is extended.

3. A thermal expansion drive device comprising:
a driven shaft configured to rotate; and
multiple dual heat exchanger units centered around the driven shaft and configured to drive rotation of the driven shaft through the creation of a gravitational imbalance in the thermal expansion drive device as portions of the multiple dual heat exchanger units are heated and cooled;
each of the multiple dual heat exchanger units comprises:
a first heat exchanger and a second heat exchanger configured to be heated and cooled by fluids, the first heat exchanger and the second exchanger positioned on opposite ends of the dual heat exchanger unit along a linear axis with both the first heat exchanger and the second heat exchanger being distal from the driven shaft and the first heat exchanger comprising at least one exchanger fluid chamber configured for housing working fluid and the second heat exchanger comprising at least one exchanger fluid chamber configured for housing the working fluid; and
a first hydraulic cylinder having a hydraulic ram and a piston, the first hydraulic cylinder connected to the first heat exchanger to provide the working fluid to and from the first hydraulic cylinder, the first hydraulic cylinder positioned along the linear axis between the first heat exchanger and the driven shaft;
a second hydraulic cylinder having a hydraulic ram and a piston, the second hydraulic cylinder connected to the second heat exchanger to provide the working fluid to and from the second hydraulic cylinder, the second hydraulic cylinder positioned along the linear axis between the second heat exchanger and the driven shaft;
a first weight secured to the ram of the first hydraulic cylinder, the first weight being movable between a contracted position closer to the driven shaft when the ram of the first hydraulic cylinder is contracted and an extended position farther away from the driven shaft when the ram of the first hydraulic cylinder is extended; and
a second weight secured to the ram of the second hydraulic cylinder, the second weight being movable between a contracted position closer to the driven shaft when the ram of the second hydraulic cylinder is contracted and an extended position farther away from the driven shaft when the ram of the second hydraulic cylinder is extended.

4. The thermal expansion drive device according to claim 3 wherein, in each of the dual heat exchanger units:
the first heat exchanger comprises two exchanger fluid chambers configured for housing the working fluid and the second heat exchanger comprises two exchanger fluid chambers configured for housing working fluid;
one of the two exchanger fluid chambers of the first heat exchanger is connected to the first hydraulic cylinder to provide and retrieve the working fluid on one side of the hydraulic piston of the first hydraulic cylinder therein and the other of the two exchanger fluid chambers of the first heat exchanger is connected to the second hydraulic cylinder to provide and retrieve working fluid on one side of the hydraulic piston of the second hydraulic cylinder therein; and
one of the two exchanger fluid chambers of the second heat exchanger is connected to the second hydraulic cylinder to provide and retrieve the working fluid on a side of the hydraulic piston of the second hydraulic cylinder therein opposite the side of hydraulic piston of the second hydraulic cylinder to which the exchanger fluid chamber of the first heat exchanger is connected and the other of the two exchanger fluid chambers of the second heat exchanger is connected to the first hydraulic cylinder to provide and retrieve the working fluid on one side of the hydraulic piston of the first hydraulic cylinder therein opposite the side of hydraulic piston of the second hydraulic cylinder to which the exchanger fluid chamber of the first heat exchanger is connected.

5. The thermal expansion drive device according to claim 3, wherein each of the dual heat exchanger units comprises a pressurized the working fluid source connected to the first hydraulic cylinder beneath a back side of the hydraulic piston of the first hydraulic cylinder opposite a front side from which the hydraulic ram of the first hydraulic cylinder extends to provide and retrieve the working fluid below the hydraulic piston of the first hydraulic cylinder and connected to the second hydraulic cylinder beneath a back side of the hydraulic piston of the second hydraulic cylinder opposite a front side from which the hydraulic ram of the second hydraulic cylinder extends to provide and retrieve the working fluid below the hydraulic piston of the second hydraulic cylinder.

6. The thermal expansion drive device according to claim 5, wherein the exchanger fluid chamber of the first heat exchanger is connected to the first hydraulic cylinder to provide and retrieve the working fluid in the first hydraulic cylinder on the front side of the hydraulic piston of the first hydraulic cylinder from which the hydraulic ram extends and the exchanger fluid chamber of the second heat exchanger is connected to the second hydraulic cylinder to provide and retrieve the working fluid in the second hydraulic cylinder on the front side of the hydraulic piston of the second hydraulic cylinder from which the hydraulic ram extends.

7. The thermal expansion drive device according to claim 6, wherein each of the dual heat exchanger units further comprises a fluid line connecting the exchanger fluid chamber of the first heat exchanger to the first hydraulic cylinder and a fluid line connecting the exchanger fluid chamber of the second heat exchanger to the second hydraulic cylinder and control valves on the fluid lines to facilitate control of the flow of the working fluid between the respective heat exchangers and the corresponding hydraulic cylinders.

8. The thermal expansion drive device according to claim 7, further comprising a controller in operable communication with the controller valve.

9. The thermal expansion drive device according to claim 3, further comprising a first fluid source configured to provide a first fluid to contact the first and second heat exchangers of the multiple dual heat exchanger units as the first and second heat exchangers pass through a first location along an outer circumference of the thermal expansion drive device formed by the first and second heat exchangers of the multiple dual heat exchanger units as the driven shaft is rotated and a second fluid source configured to provide a second fluid to contact the first and second heat exchangers of the multiple dual heat exchanger units as the first and second heat exchangers pass through a second location along the outer circumference of the thermal expansion drive device as the driven shaft is rotated.

10. The thermal expansion drive device according to claim 9, in which a temperature differential exists between the first fluid and the second fluid that is great enough to cause the working fluid within the respective exchanger fluid chambers to expand and contract to move the hydraulic rams within the hydraulic cylinders.

11. The thermal expansion drive device according to claim 9, wherein the first location through which the first and second heat exchangers pass is positioned along the outer circumference of the thermal expansion drive device relative to the second location such that the first weight connected to the hydraulic ram of the first hydraulic cylinder is in the contracted position when the second weight connected to the hydraulic ram of the second hydraulic cylinder is in the extended position and the first weight connected to the hydraulic ram of the first hydraulic cylinder is in the extended position when the second weight connected to the hydraulic ram of the second hydraulic cylinder is in the contracted position.

12. The thermal expansion drive device according to claim 3, further comprising an inner orbit in which the first and second weights travel when the first and second weights are in their respective contracted position and an outer orbit in which the first and second weights travel when the first and second weights are in their respective extended position.

13. The thermal expansion drive device according to claim 3, wherein, within each dual heat exchanger unit, the ram of the first hydraulic cylinder is contracted by the working fluid within one of the exchanger fluid chambers in the first heat exchanger that is expanded through heating the working fluid by a first fluid contacting the first heat exchanger and by the working fluid within one of the exchanger fluid chambers in the second heat exchanger that is contracted through withdrawal of heat from the working fluid by a second fluid contacting the second heat exchanger.

14. The thermal expansion drive device according to claim 3, wherein, within each dual heat exchanger unit, the ram of the second hydraulic cylinder is contracted by the working fluid within one of the exchanger fluid chambers in the second heat exchanger that is expanded through heating the working fluid by a first fluid contacting the second heat exchanger and by the working fluid within one of the exchanger fluid chambers in the first heat exchanger that is contracted through withdrawal of heat from the working fluid by a second fluid contacting the first heat exchanger.

15. The thermal expansion drive device according to claim 3, wherein, within each dual heat exchanger unit, the ram of the first hydraulic cylinder is extended by the working fluid within one of the exchanger fluid chambers in the first heat exchanger that is contracted through withdrawal of heat from the working fluid by a second fluid contacting the first heat exchanger and by the working fluid within one of the exchanger fluid chambers in the second heat exchanger that is expanded through heating the working fluid by a first fluid contacting the second heat exchanger.

16. The thermal expansion drive device according to claim 3, wherein, within each dual heat exchanger unit, the ram of the second hydraulic cylinder is extended by the working fluid within one of the exchanger fluid chambers in the second heat exchanger that is contracted through withdrawal of heat from the working fluid by a second fluid contacting the second heat exchanger and by the working fluid within one of the exchanger fluid chambers in the first heat exchanger that is expanded through heating the working fluid by a first fluid contacting the first heat exchanger.

17. The thermal expansion drive device according to claim 3, further comprising a main gear associated with the multiple dual heat exchanger units and secured to the driven shaft, the main gear configured to drive a generator shaft.

18. The thermal expansion drive device according to claim 3, further comprising one or more additional sets of multiple dual heat exchanger units secured to the driven shaft and a main gear associated with each of the sets of multiple dual heat exchanger units and secured to the driven shaft.

19. The thermal expansion drive device according to claim 3, further comprising one or more additional driven shafts with each driven shaft having one or more sets of multiple dual heat exchanger units secured to the respective driven shafts and a main gear associated with each of the sets of multiple dual heat exchanger units and secured to the respective driven shaft, wherein the main gears are used to drive a generator shaft.

* * * * *